US012782744B2

(12) United States Patent
Radhakrishnan et al.

(10) Patent No.: US 12,782,744 B2

(45) Date of Patent: Nov. 3, 2026

(54) HEAD-MOUNTED DISPLAY

(71) Applicant: SONY GROUP CORPORATION, Tokyo (JP)

(72) Inventors: Balachandran Radhakrishnan, Tokyo (JP); Masafumi Yoneda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 19/114,141

(22) PCT Filed: Aug. 15, 2023

(86) PCT No.: PCT/JP2023/029482

§ 371 (c)(1),
(2) Date: Mar. 21, 2025

(87) PCT Pub. No.: WO2024/070289

PCT Pub. Date: Apr. 4, 2024

(65) Prior Publication Data

US 2026/0099054 A1 Apr. 9, 2026

(30) Foreign Application Priority Data

Sep. 29, 2022 (JP) ................................ 2022-157019

(51) Int. Cl.
*G02B 27/01* (2006.01)

(52) U.S. Cl.
CPC ..... *G02B 27/0176* (2013.01); *G02B 27/0172* (2013.01); *G02B 2027/015* (2013.01);
(Continued)

(58) Field of Classification Search
CPC ............ G02B 27/0176; G02B 27/0172; G02B 2027/015; G02B 2027/0156;
(Continued)

(56) References Cited

U.S. PATENT DOCUMENTS

2013/0021311 A1 1/2013 Watanabe
2021/0149206 A1* 5/2021 Tiffin .................... G03B 30/00
2021/0303025 A1 9/2021 Chi

FOREIGN PATENT DOCUMENTS

EP 0821257 A2 1/1998
JP H09504120 A 4/1997
(Continued)

OTHER PUBLICATIONS

International Search Report and Written Opinion of PCT Application No. PCT/JP2023/029482, issued on Oct. 24, 2023, 13 pages of ISRWO.

*Primary Examiner* — Yaron Cohen
(74) *Attorney, Agent, or Firm* — CHIP LAW GROUP

(57) ABSTRACT

A head-mounted display according to an embodiment of the present technology includes a first housing portion, a second housing portion, a band, and an electrical connection portion. A display unit which displays an image is arranged in the first housing portion. A substrate is arranged in the second housing portion. The band includes a hinge and connects the first housing portion and the second housing portion such that the first housing portion and the second housing portion become rotatable about the hinge. The electrical connection portion is arranged in the band and electrically connects the display unit and the substrate.

20 Claims, 29 Drawing Sheets

B

(52) U.S. Cl.
CPC ................ *G02B 2027/0156* (2013.01); *G02B 2027/0161* (2013.01); *G02B 2027/0169* (2013.01); *G02B 2027/0178* (2013.01)

(58) Field of Classification Search
CPC .... G02B 2027/0161; G02B 2027/0169; G02B 2027/0178; G02B 2027/0152; G02B 2027/0154; G06F 1/163; G06F 1/1681; G06F 3/012
See application file for complete search history.

(56) References Cited

FOREIGN PATENT DOCUMENTS

| | | | |
|---|---|---|---|
| JP | 2004085476 | A | 3/2004 |
| JP | 2004096224 | A | 3/2004 |
| JP | 2011209472 | A | 10/2011 |
| JP | 2012089984 | A | 5/2012 |
| JP | 2017049468 | A | 3/2017 |

* cited by examiner

A

B

A

B

A

B

A

B

A

B

A

B

A

B

A

B

A

B

C

A

B

C

A

B

C

E

A

B

A

B

A

B

A

B

HEAD-MOUNTED DISPLAY

CROSS REFERENCE TO RELATED APPLICATIONS

This application is a U.S. National Phase of International Patent Application No. PCT/JP2023/029482 filed on Aug. 15, 2023, which claims priority benefit of Japanese Patent Application No. JP 2022-157019 filed in the Japan Patent Office on Sep. 29, 2022. Each of the above-referenced applications is hereby incorporated herein by reference in its entirety.

TECHNICAL FIELD

The present technology relates to a head-mounted display that is worn on a head of a user to be used.

BACKGROUND ART

Patent Literature 1 discloses a head-mounted display capable of detecting an orientation of a head of a user. In this head-mounted display, a yaw angle of the head is detected by a gyro sensor. In addition, a pitch angle and roll angle of the head are detected by an acceleration sensor. Thus, the orientation of the head of the user can be detected with a simple sensor configuration.

CITATION LIST

Patent Literature

Patent Literature 1: Japanese Patent Application Laid-open No. 2004-85476

DISCLOSURE OF INVENTION

Technical Problem

In this manner, a technology that enables convenience of a user who uses a head-mounted display to be improved is being demanded.

In view of the circumstances as described above, the present technology aims at providing a head-mounted display that enables convenience of a user to be improved.

Solution to Problem

To attain the object described above, a head-mounted display according to an embodiment of the present technology includes a first housing portion, a second housing portion, a band, and an electrical connection portion.

A display unit which displays an image is arranged in the first housing portion.

A substrate is arranged in the second housing portion.

The band includes a hinge and connects the first housing portion and the second housing portion such that the first housing portion and the second housing portion become rotatable while using the hinge as a rotation center.

The electrical connection portion is arranged in the band and electrically connects the display unit and the substrate.

In the head-mounted display, the first housing portion and the second housing portion are rotatably connected about the hinge. In addition, the display unit and the substrate are electrically connected. Thus, the convenience of the user can be improved.

The head-mounted display may be capable of accommodating the second housing portion on an inner side of the first housing portion by the rotation of the first housing portion and the second housing portion that uses the hinge as the rotation center.

An accommodation position of the second housing portion may be a position that does not inhibit an area where a user watches the display unit.

The band may include a first connection member which is connected to the first housing portion and a second connection member which is connected to the second housing portion. In this case, the first connection member and the second connection member may be connected to become rotatable while using the hinge as the rotation center.

The first connection member may include a first end portion and a second end portion on an opposite side of the first end portion. In this case, the second connection member may include a third end portion and a fourth end portion on an opposite side of the third end portion. Further, the hinge may include a first hinge portion which rotatably connects the first end portion and the third end portion and a second hinge portion which rotatably connects the second end portion and the fourth end portion.

The first connection member may include a first adjustment mechanism capable of adjusting a length from the first end portion to the second end portion.

The first connection member may include a first division member including the first end portion and a second division member including the second end portion. In this case, the first adjustment mechanism may include a coupling member which connects the first division member and the second division member such that the first division member and the second division member are capable of moving relatively.

The coupling member may connect the first division member and the second division member such that a movement of the first division member and a movement of the second division member are synchronized.

The first connection member may include a reference point which becomes a reference for a distance of the first end portion of the first division member and a distance of the second end portion of the second division member. In this case, the coupling member may connect the first division member and the second division member such that a distance from the reference point to the first end portion and a distance from the reference point to the second end portion are synchronized.

The first connection member may include a restriction portion which restricts detachment of the first connection member from the first housing portion.

The first connection member may include a first end portion and a reference point which becomes a reference for a distance of the first end portion. In this case, the restriction portion may restrict a change of a distance from the reference point to the first end portion so that the distance from the reference point to the first end portion does not become larger than a predetermined length.

The second connection member may include a second adjustment mechanism capable of adjusting a length from the third end portion to the fourth end portion.

The electrical connection portion may include a flexible substrate which electrically connects the display unit and the substrate. In this case, the flexible substrate may be deformed along with the adjustment of the length from the third end portion to the fourth end portion of the second connection member by the second adjustment mechanism.

Further, the second housing portion may include an accommodation member which accommodates the deformed flexible substrate.

The electrical connection portion may include a cable which electrically connects the display unit and the substrate. In this case, the second housing portion may include a winding member which winds the cable in accordance with the adjustment of the length from the third end portion to the fourth end portion of the second connection member by the second adjustment mechanism.

The electrical connection portion may include a cable which electrically connects the display unit and the substrate. In this case, the second connection member may include a groove portion into which the cable is press-fit. Further, the second housing portion may include a press fit member which press-fits the cable into the groove portion in accordance with the adjustment of the length from the third end portion to the fourth end portion of the second connection member by the second adjustment mechanism.

The hinge may include a fixing mechanism which fixes a relative rotation angle of the first housing portion and the second housing portion about the hinge at a predetermined angle.

A battery may be arranged in the second housing portion.

The first housing portion may include a first protrusion portion. In this case, the second housing portion may include a second protrusion portion. Further, the first protrusion portion and the second protrusion portion may come into contact with each other in a state where the second housing portion is accommodated.

At least one of the first protrusion portion or the second protrusion portion may include a spring mechanism. In this case, the second housing portion may be fixed by pressing by the spring mechanism in the state where the second housing portion is accommodated.

The hinge may include a limitation mechanism which limits the rotation of the first housing portion and the second housing portion so that a relative rotation angle of the first housing portion and the second housing portion about the hinge does not become equal to or larger than a predetermined angle.

MODES FOR CARRYING OUT THE INVENTION

Hereinafter, embodiments according to the present technology will be described with reference to the drawings.

First Embodiment

[Head-Mounted Display]

Figure 1:
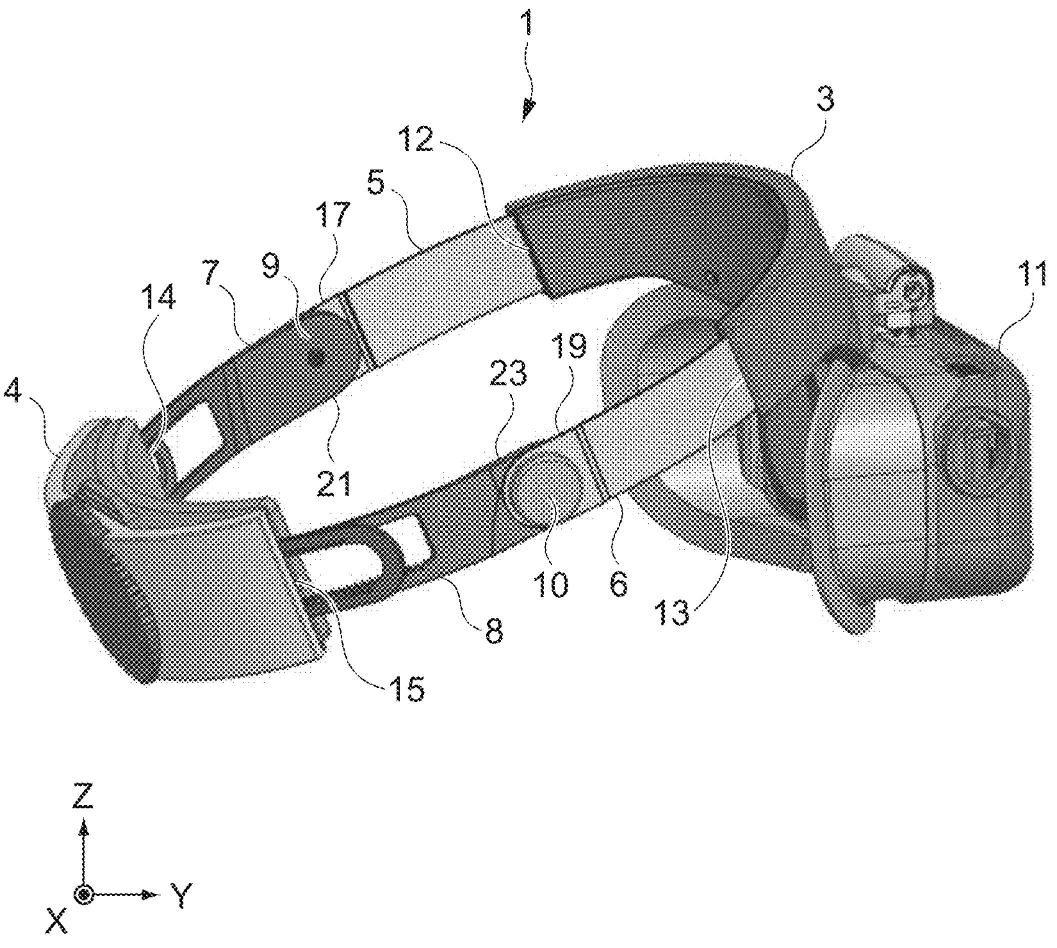
FIG. 1 A schematic diagram showing a configuration example of a head-mounted display according to an embodiment of the present technology.

FIG. 1 is a schematic diagram showing a configuration example of a head-mounted display according to an embodiment of the present technology. FIG. 1 shows a state where a head-mounted display 1 is seen from the side.

Hereinafter, descriptions will be given while an X direction is set as a left-right direction (a positive side of an X axis is the right side, and a negative side thereof is the left side), a Y direction is set as a front-rear direction or a depth direction (a positive side of a Y axis is the front side or near side, and a negative side thereof is the rear side or back side), and a Z direction is set as an up-down direction (a positive side of a Z axis is the upper side, and a negative side thereof is the lower side). Of course, regarding the application of the present technology, a direction in which the head-mounted display 1 is used, or the like is not limited.

Figure 2:
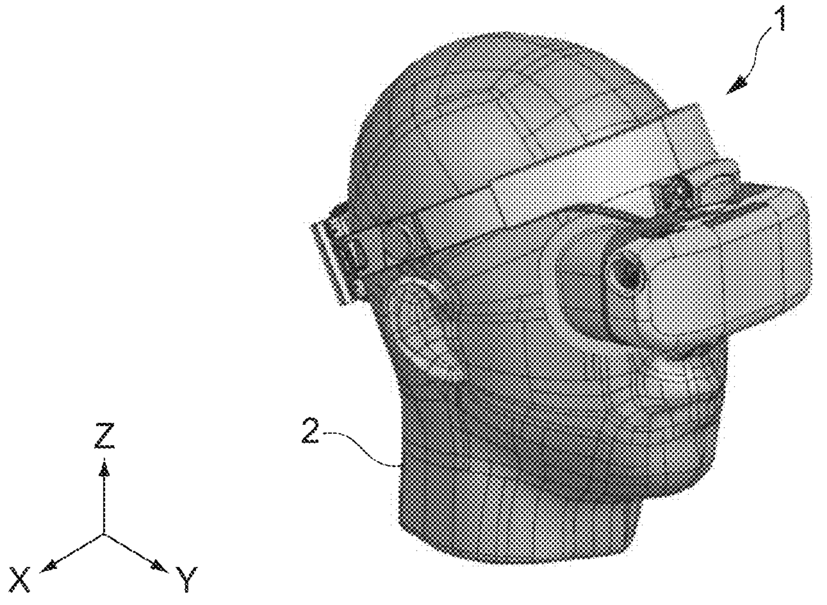
FIG. 2 Schematic diagrams each showing a state where a user is wearing the head-mounted display.
Figure 2:
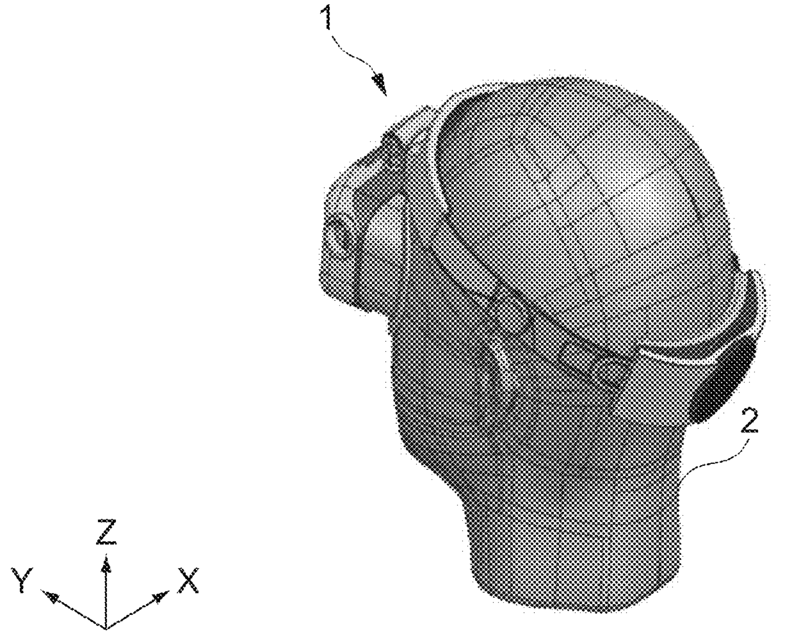

FIG. 2 are schematic diagrams each showing a state where a user is wearing the head-mounted display 1. FIG. 2A shows a state where a user 2 is seen from the diagonally forward right side. FIG. 2B shows a state where the user 2 is seen from the diagonally backward left side.

A head-mounted display (HMD: Head-mounted display) is a head-worn display apparatus. The user 2 wears the head-mounted display 1 on a head as shown in FIG. 2 to view a display provided inside. Thus, the user 2 can view a video with high immersiveness. It is noted that the head-mounted display may also be referred to as a head mounted display in general.

As shown in FIG. 1, the head-mounted display 1 includes a front housing 3, a rear housing 4, a left rack 5, a right rack 6, a left band 7, a right band 8, a left hinge 9, a right hinge 10, and a display unit 11.

The front housing 3 is a housing portion positioned on the front side (the positive side of the Y axis) of the head-mounted display 1. The front housing 3 is constituted of a curved plate shape and has an arc shape protruding toward the front side when seen from the upper side (the positive side of the Z axis). The front housing 3 includes two left and right end portions, and an insertion port 12 into which the left rack 5 is inserted is formed at the left end portion. In addition, an insertion port 13 into which the right rack 6 is inserted is formed at the right end portion. When the head-mounted display 1 is worn, a forehead of the user 2 comes into contact with a rear-side (the negative side of the Y axis) surface of the front housing 3.

The rear housing 4 is a housing portion positioned on the rear side of the head-mounted display 1. The rear housing 4 is constituted of a curved plate shape and has an arc shape protruding toward the rear side when seen from the upper side. The front housing 3 includes two left and right end portions, and an insertion port 14 into which the left band 7 is inserted is formed at the left end portion. In addition, an insertion port 15 into which the right band 8 is inserted is formed at the right end portion. When the head-mounted display 1 is worn, the back of the head of the user 2 comes into contact with a front-side surface of the rear housing 4.

The front housing 3 and the rear housing 4 are each formed of, for example, a material having rigidity such as plastic and metal. Of course, specific configurations of the front housing 3 and the rear housing 4 including the material, the shape, and the like are not limited.

The left rack 5 is a member positioned on the front left side (the negative side of the X axis, the positive side of the Y axis) of the head-mounted display 1. The left rack 5 has a band shape and includes two end portions 16 and 17. The end portion 16 is inserted into the insertion port 12 on the left side of the front housing 3, and thus the left rack 5 and the front housing 3 are connected.

The right rack 6 is a member positioned on the front right side of the head-mounted display 1. The right rack 6 has a band shape and includes two end portions 18 and 19. The end portion 18 is inserted into the insertion port 13 on the right side of the front housing 3, and thus the right rack 6 and the front housing 3 are connected.

The left band 7 is a member positioned on the rear left side of the head-mounted display 1. The left band 7 has a band shape and includes two end portions 20 and 21. The end portion 20 is inserted into the insertion port 14 on the left side of the rear housing 4, and thus the left band 7 and the rear housing 4 are connected.

The right band 8 is a member positioned on the rear right side of the head-mounted display 1. The right band 8 has a band shape and includes two end portions 22 and 23. The end portion 22 is inserted into the insertion port 15 on the right side of the rear housing 4, and thus the right band 8 and the rear housing 4 are connected.

The left rack 5, the right rack 6, the left band 7, and the right band 8 are each formed of a material having stretchability, for example. As shown in FIG. 1, the left rack 5, the right rack 6, the left band 7, and the right band 8 are each arranged while being curved to a certain extent and can each be deformed along a shape of the head of the user 2 when the head-mounted display 1 is worn. Of course, specific configurations of the left rack 5, the right rack 6, the left band 7, and the right band 8 including the material, the shape, and the like are not limited.

The left hinge 9 is a hinge which connects the left rack 5 and the left band 7. In the present embodiment, the end portion 17 of the left rack 5 and the end portion 21 of the left band 7 are connected by the left hinge 9. The right hinge 10 is a hinge which connects the right rack 6 and the right band 8. In the present embodiment, the end portion 19 of the right rack 6 and the end portion 23 of the right band 8 are connected by the right hinge 10.

The left hinge 9 is roughly positioned at a center of the left side of the head-mounted display 1 in the front-rear direction (Y direction). The right hinge 10 is roughly positioned at a center of the right side of the head-mounted display 1 in the front-rear direction. Specific configurations including the positions at which the left hinge 9 and the right hinge 10 are arranged, the connection methods that use the left hinge 9 and the right hinge 10, and the like are not limited.

The display unit 11 is a housing portion to be attached to both eyes of the user 2. The display unit 11 is connected on the lower side of the front housing 3. Further, the display unit 11 displays an image. Specifically, the display unit 11 is a goggle-type housing, and a display is arranged inside. The display is, for example, a display device that uses liquid crystal, EL (Electro-Luminescence), or the like, and various images, various GUIs (Graphical User Interfaces), and the like are displayed thereon. Thus, the user 2 can view videos. Of course, a specific configuration of the display unit 11 including the type, the shape, the connection method with respect to the front housing 3, and the like is not limited.

A first housing portion according to the present technology is realized by the front housing 3 and the display unit 11.

The rear housing 4 corresponds to an embodiment of a second housing portion according to the present technology.

The left rack 5 corresponds to an embodiment of a first division member according to the present technology.

The right rack 6 corresponds to an embodiment of a second division member according to the present technology.

The end portion 17 of the left rack 5 corresponds to an embodiment of a first end portion according to the present technology.

The end portion 19 of the right rack 6 corresponds to an embodiment of a second end portion according to the present technology.

The end portion 21 of the left band 7 corresponds to an embodiment of a third end portion according to the present technology.

The end portion 23 of the right band 8 corresponds to an embodiment of a fourth end portion according to the present technology.

The left hinge 9 corresponds to an embodiment of a first hinge portion according to the present technology.

The right hinge 10 corresponds to an embodiment of a second hinge portion according to the present technology.

A hinge according to the present technology is realized by the left hinge 9 and the right hinge 10.

[Internal Structure of Front Housing]

Figure 3:
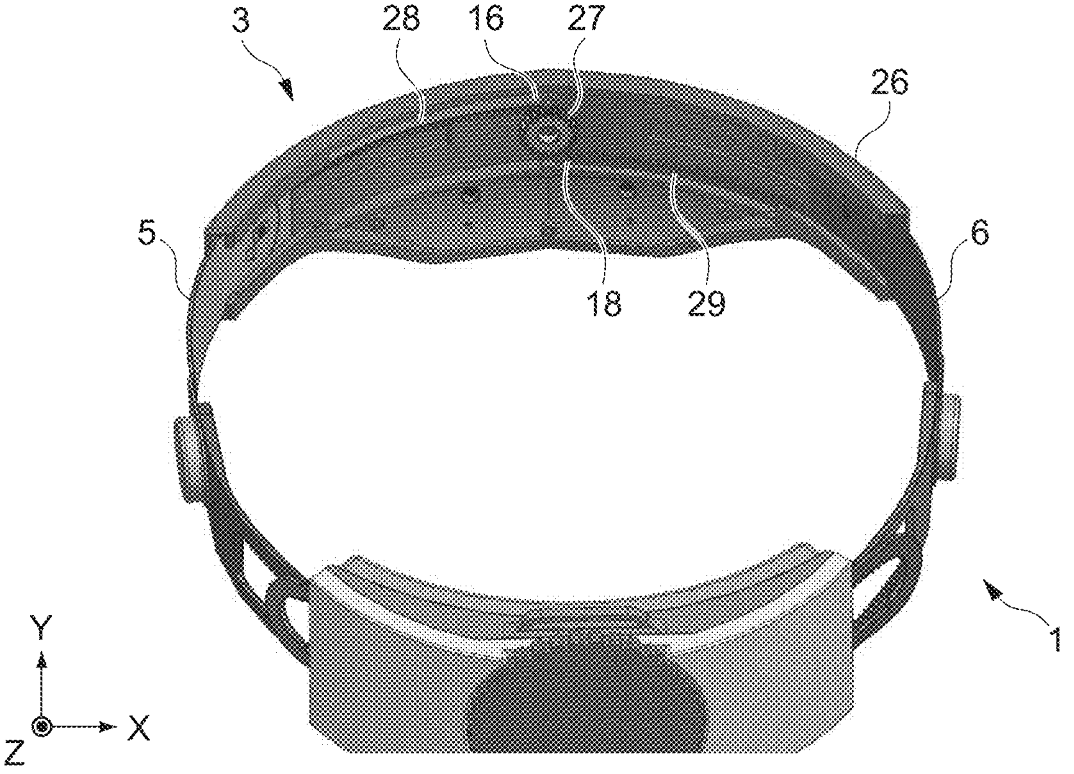
FIG. 3 Schematic diagrams each showing an internal structure of a front housing.
Figure 3:
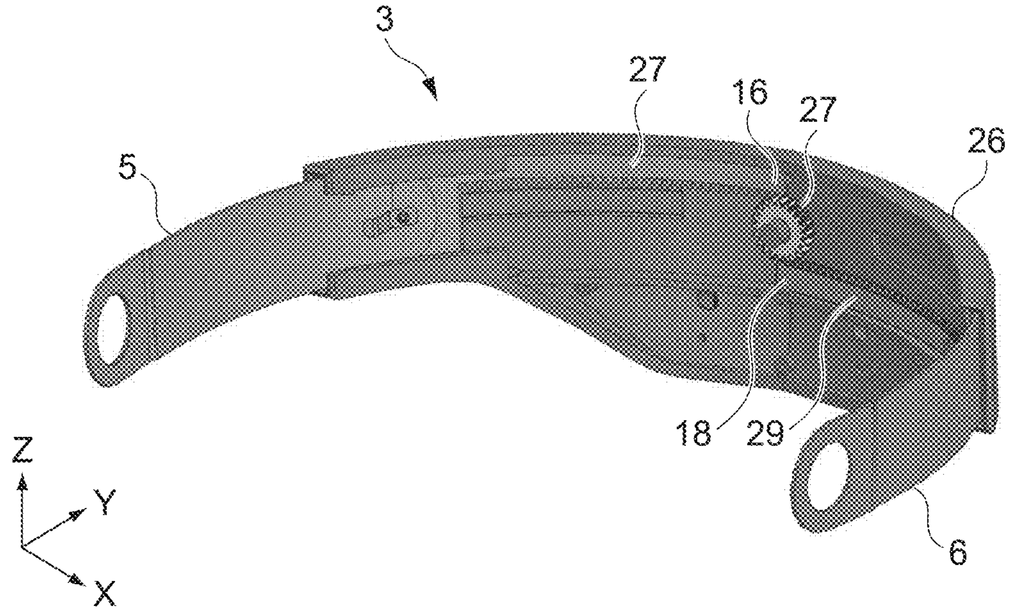

FIG. 3 are schematic diagrams each showing an internal structure of the front housing 3. FIG. 3A shows a state where the head-mounted display 1 is seen from the rear side. FIG. 3B shows a state where the front housing 3 is seen from the diagonally backward right side. It is noted that in FIG. 3, an illustration of the rear half of the front housing 3 is omitted so that the internal structure of the front housing 3 can be seen. In other words, only the front half (front cover 26) of the front housing 3 is shown. Moreover, an illustration of the display unit 11 is omitted in FIG. 3A.

As shown in FIG. 3, a pinion gear 27 is arranged in the front cover 26. Specifically, the pinion gear 27 is arranged at a center of a rear-side surface of the front cover 26 in the left-right direction.

Further, roughly a half of the left rack 5 on the end portion 16 side (the side that is inserted into the front housing 3) becomes an engagement portion 28 for engaging with the pinion gear 27. The engagement portion 28 has a strap shape, and downward teeth (gear) are formed therein.

Similarly, roughly a half of the right rack 6 on the end portion 18 side (the side that is inserted into the front housing 3) becomes an engagement portion 29 for engaging with the pinion gear 27. The engagement portion 29 has a strap shape, and upward teeth are formed therein.

The engagement portion 28 of the left rack 5 engages with the pinion gear 27 from the upper side. Specifically, the downward teeth of the engagement portion 28 engage with teeth at an upper portion of the pinion gear 27. Similarly, the upward teeth of the engagement portion 29 of the right rack 6 engage with teeth at a lower portion of the pinion gear 27 so that the engagement portion 29 engages with the pinion gear 27 from the lower side. FIG. 3 show a state where the teeth in the vicinity of the end portions 16 and 18 are engaged with the teeth of the pinion gear 27.

A specific configuration of the pinion gear 27 including the shape, the material, the arrangement method, and the like is not limited.

The pinion gear 27 corresponds to an embodiment of a coupling member according to the present technology.

Further, the pinion gear 27 corresponds to an embodiment of a first adjustment mechanism according to the present technology.

A first connection member according to the present technology is realized by the left rack 5, the right rack 6, and the pinion gear 27.

[Internal Structure of Rear Housing]

Figure 4:
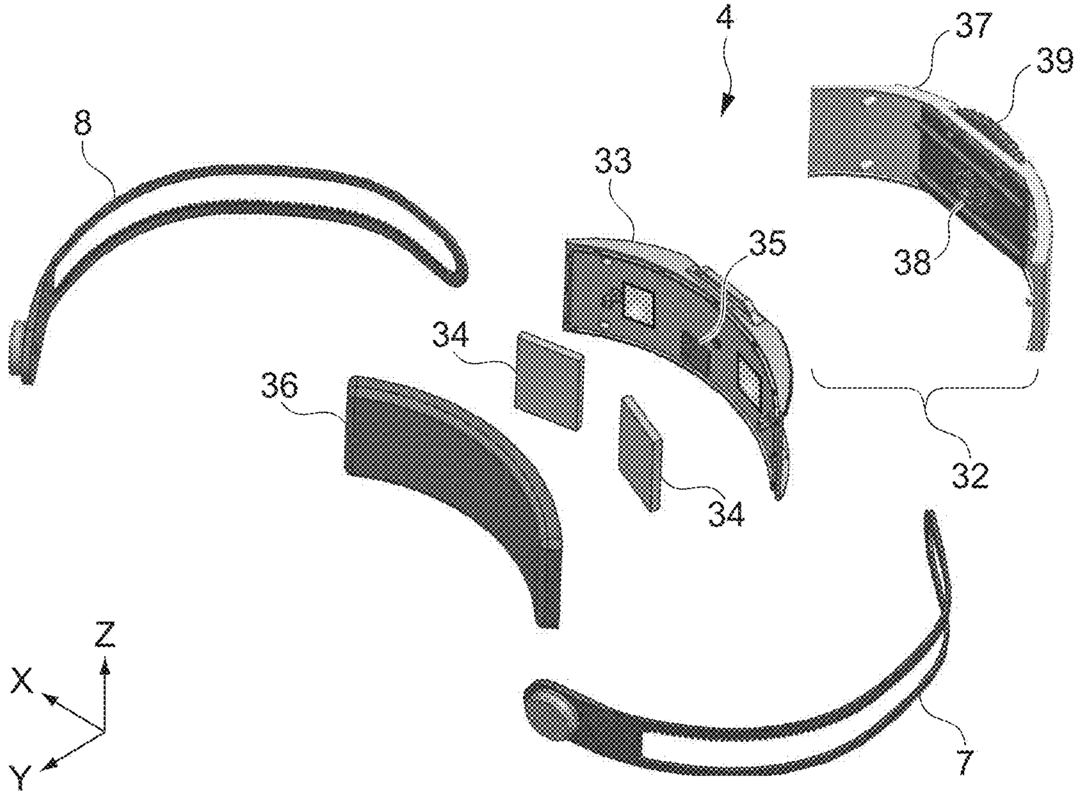
FIG. 4 A schematic diagram showing an internal structure of a rear housing.

FIG. 4 is a schematic diagram showing an internal structure of the rear housing 4. FIG. 4 shows an exploded view in which a state where the rear housing 4 is broken down to respective components is seen from the diagonally forward left side. In addition, the left band 7 and the right band 8 are also illustrated.

The rear housing 4 includes a rear dial block 32, a rear cover 33, batteries 34, a substrate 35, and a rear head guard 36. The rear dial block 32 includes a base portion 37, a pinion gear 38, and a rear dial 39.

The base portion 37 is a member which becomes a base for the rear side (the negative side of the Y axis) of the rear housing 4. The base portion 37 is constituted of a curved plate shape and has an arc shape protruding toward the rear side when seen from the upper side.

The pinion gear 38 is arranged at a center of a front-side (the positive side of the Y axis) surface of the base portion 37 in the left-right direction. In the present embodiment, downward teeth are formed at an upper portion of the left band 7. In addition, upward teeth are formed at a lower portion of the right band. When the left band 7 and the right band 8 are inserted into the rear housing 4, the teeth of the left band 7 engage with teeth at an upper portion of the pinion gear 38. In addition, the teeth of the right band 8 engage with teeth at a lower portion of the pinion gear 38.

The rear dial 39 is a dial for causing the pinion gear 38 to rotate. The pinion gear 38 and the rear dial 39 are connected such that rotation shafts thereof become the same. The rear dial 39 is exposed on the rear-side surface of the rear housing 4, and by the user 2 rotating the rear dial 39, the pinion gear 38 also rotates integrally.

Specific configurations of the base portion 37, the pinion gear 38, and the rear dial 39 including the shape, the material, the arrangement method, and the like are not limited.

The pinion gear 38 corresponds to an embodiment of a second adjustment mechanism according to the present technology.

A second connection member according to the present technology is realized by the left band 7, the right band 8, and the pinion gear 38.

A band according to the present technology is realized by the left rack 5, the right rack 6, the left band 7, the right band 8, the left hinge 9, the right hinge 10, the pinion gear 27, and the pinion gear 38.

The rear cover 33 is a member which becomes a base for the front side of the rear housing 4. The base portion 37 is constituted of a curved plate shape and has an arc shape protruding toward the rear side when seen from the upper side.

The batteries 34 are arranged two in total, one each on left and right sides on the front-side surface of the rear cover 33. In FIG. 4, positions at which the batteries 34 are arranged are schematically indicated by squares in hatched patterns. The batteries 34 are bonded to the rear cover 33 by, for example, an adhesive sheet or the like.

In the present embodiment, power is supplied from the batteries 34 to thus realize the drive of the head-mounted display 1. Of course, power may be supplied by an external power supply without arranging the batteries 34. For example, it is also possible to use the head-mounted display 1 by connecting it to a personal computer so that power is supplied from the personal computer. Besides these, a specific configuration of the batteries 34 including the type, the number, the arrangement, and the like is not limited.

The substrate 35 is arranged at a center of the front-side surface of the rear cover 33. In the present embodiment, for example, a printed circuit board (PCB: printed circuit board), a flexible substrate, or the like is used as the substrate 35, and control of supply of power from the batteries 34 to various mechanisms, and the like are performed. Of course, the type of the substrate 35 is not limited to the printed circuit board and the flexible substrate, and the substrate 35 of an arbitrary type may be used. In addition, a specific configuration of the substrate 35 including the arrangement and the like is also not limited.

The rear head guard 36 is a member that comes into contact with the back of the head of the user 2. The rear head guard 36 is constituted of a curved plate shape and has an arc shape protruding toward the rear side when seen from the upper side. The rear head guard 36 is a cushion material and is formed of, for example, a flexible material such as urethane foam.

The rear head guard 36 is arranged so as to cover the entire front-side surface of the rear cover 33. In other words, the batteries 34 and the substrate 35 are sandwiched by the rear head guard 36 and the rear cover 33. By arranging the rear head guard 36, the rear head guard 36 is abutted against the back of the head of the user 2 when worn, and a sense of fit is improved. In addition, the batteries 34 and the substrate 35 are protected from external impact. A specific configuration of the rear head guard 36 including the shape, the material, and the like is not limited.

[Slide Operation of Rack]

Figure 5:
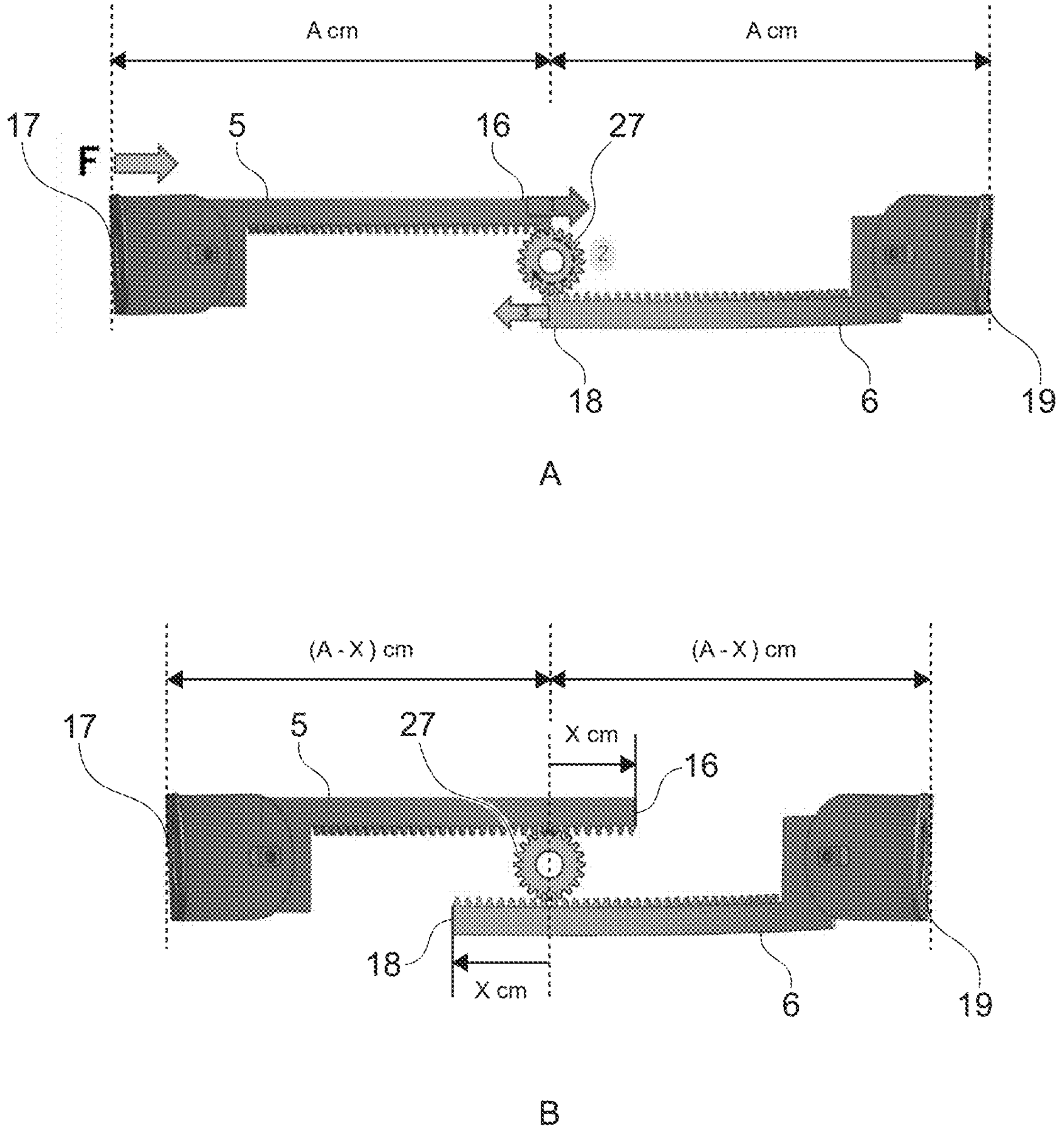
FIG. 5 Schematic diagrams each showing a slide operation of a left rack and a right rack in the front housing.

FIG. 5 are schematic diagrams each showing a slide operation of the left rack 5 and the right rack 6 in the front housing 3. FIG. 5A shows a state where the vicinity of the end portion 16 of the left rack 5 and the vicinity of the end portion 18 of the right rack 6 are engaged with the pinion gear 27.

In the present embodiment, each of the left rack 5 and the right rack 6 is capable of sliding in the left-right direction while maintaining the engaged state with the pinion gear 27. Specifically, when a rightward force F is applied to the left rack 5 as shown in FIG. 5A, the left rack 5 slides toward the right side (a direction indicated by an arrow 1). At this time, since the downward teeth of the left rack 5 are engaged with the teeth at the upper portion of the pinion gear 27, the pinion gear 27 rotates clockwise (a direction indicated by an arrow 2). Consequently, since the upward teeth of the right rack 6 are engaged with the teeth at the lower portion of the pinion gear 27, the right rack 6 slides toward the left side (a direction indicated by an arrow 3).

FIG. 5B shows a state after the left rack 5 and the right rack 6 have slid a certain amount from the state shown in FIG. 5A. In FIG. 5B, the left rack 5 has slid toward the right side and is engaged with the pinion gear 27 at a portion more on an inner side (left side) than the end portion 16. Moreover, the right rack 6 has slid toward the left side and is engaged with the pinion gear 27 at a portion more on an inner side (right side) than the end portion 18.

Similarly, also when a leftward force is applied to the right rack 6, each of the left rack 5 and the right rack 6 slides toward the inner side. Conversely, when a leftward force is applied to the left rack 5 or a rightward force is applied to the right rack 6, each of the left rack 5 and the right rack 6 slides toward an outer side.

Figure 6:
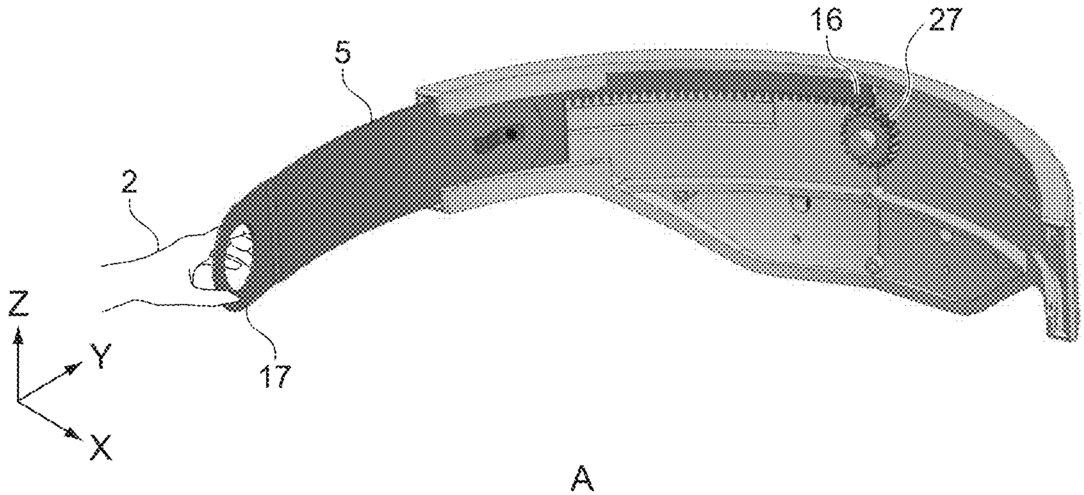
FIG. 6 Schematic diagrams each showing a slide operation of the left rack by the user.
Figure 6:
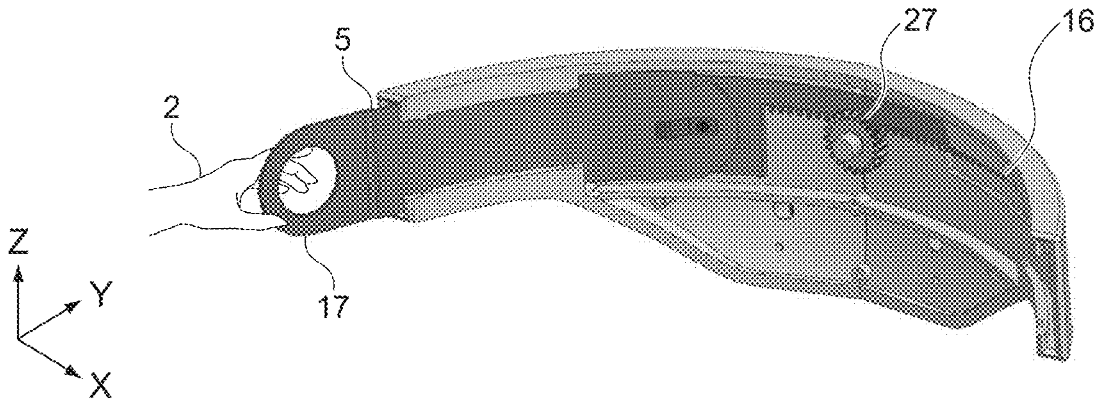

FIG. 6 are schematic diagrams each showing a slide operation of the left rack 5 by the user 2. FIG. 6A shows a state where the vicinity of the end portion 16 of the left rack 5 is engaged with the pinion gear 27. FIG. 6B shows a state after the left rack 5 has slid a certain amount from the state shown in FIG. 6A. It is noted that the illustration of the right rack 6 is omitted in FIG. 6.

As shown in FIG. 6, by the user 2 holding the end portion 17 of the left rack 5 and applying a force, the left rack 5 and the right rack 6 slide in the left-right direction. Alternatively, it is also possible to cause the left rack 5 and the right rack 6 to slide by applying a force to the end portion 19 of the right rack 6.

In the present embodiment, the left rack 5, the right rack 6, or the pinion gear 27 includes a reference point that becomes a reference for a distance of the end portion 17 of the left rack 5 and a distance of the end portion 19 of the right rack 6, and the left rack 5 and the right rack 6 are connected such that the distance from the reference point to the end portion 17 of the left rack 5 and the distance from the reference point to the end portion 19 of the right rack 6 are synchronized by the pinion gear 27.

Specifically, in the present embodiment, the pinion gear 27 becomes the reference point. In other words, a distance from the pinion gear 27 to the end portion 17 and a distance from the pinion gear 27 to the end portion 19 are synchronized (a state where the distances are equal is constantly maintained). For example, in FIG. 5A, the distances are both A cm and are thus equal.

When the left rack 5 and the right rack 6 slide from this state, the left rack 5 and the right rack 6 move an equal distance (X cm) as shown in FIG. 5B. For example, the movement by the equal distance is realized by forming teeth of the same shape in each of the left rack 5 and the right rack 6.

Accordingly, the respective distances after the slide both become (A-X) cm, and a state where the distances are equal is maintained. In other words, it can also be said that the left rack 5 and the right rack 6 are constantly maintained in a state where the left rack 5 and the right rack 6 are arranged symmetrically about the pinion gear 27. It is noted that a case where the respective distances are not completely the same and differ more or less is also included in the technical scope of the present technology.

Moreover, the reference point is not limited to the pinion gear 27 and may be a predetermined position on the left rack 5 or the right rack 6, for example. For example, when a portion on the left rack 5 that is deviated 1 cm to the left from the pinion gear 27 becomes the reference point, a state where the distances from the reference point to the respective end portions are equal is maintained with respect to the reference point. In this manner, the distances may be synchronized while being bilaterally asymmetric with respect to the pinion gear 27.

In the present embodiment, the left rack 5 and the right rack 6 are connected such that the movement of the left rack 5 and the movement of the right rack 6 are synchronized by the pinion gear 27. In other words, when the left rack 5 moves, the right rack 6 also moves along in some form. In the present embodiment, the right rack 6 moves a distance equal to the movement distance of the left rack 5, but the movement amounts may be asymmetric like, for example, when the left rack 5 moves X cm to the right, the right rack 6 moves 2X cm to the left, or the like. Alternatively, a configuration in which, when the left rack 5 moves to the right, the right rack 6 also moves to the right is also possible. Besides these, an arbitrary configuration in which the right rack 6 moves along with the movement of the left rack 5 in some form can be adopted.

Also in the present embodiment, the left rack 5 and the right rack 6 are connected by the pinion gear 27 so as to be capable of moving relatively. In other words, the relative position between the left rack 5 and the right rack 6 changes in accordance with the rotation of the pinion gear 27. In the present embodiment, the relative position changes by the movements of both of the left rack 5 and the right rack 6, but a case where only the left rack 5 moves, for example, can also be said that the relative position changes. In other words, a configuration in which, when the pinion gear 27 rotates, only the left rack 5 moves and the right rack 6 does not move may be adopted. Conversely, a configuration in which only the right rack 6 moves and the left rack 5 does not move may alternatively be adopted. Besides these, an arbitrary configuration in which the left rack 5 and the right rack 6 are connected so as to be capable of moving relatively may be adopted.

Also in the present embodiment, the length from the end portion 17 to the end portion 19 can be adjusted by the pinion gear 27. Specifically, when the user 2 applies a force to the left rack 5 or the right rack 6, the pinion gear 27 rotates, and the left rack 5 and the right rack 6 move. Thus, the length from the end portion 17 to the end portion 19 changes.

For example, when the left rack 5 moves X cm to the right and the right rack 6 moves X cm to the left as shown in FIG. 5B, the length from the end portion 17 to the end portion 19 becomes short by 2X cm. In other words, the length between the end portions changes only by an amount corresponding to twice the movement amount of each of the left rack 5 and the right rack 6.

Further, an insertion amount of each of the left rack 5 and the right rack 6 increases X cm. In other words, lengths of respective portions of the left rack 5 and the right rack 6, that are inserted into the front housing 3 and are not exposed to the outside, increase X cm each. Conversely, exposure amounts of the left rack 5 and the right rack 6 are reduced X cm each. In other words, lengths of respective portions of the left rack 5 and the right rack 6, that are not inserted into the front housing 3 and are exposed to the outside, are reduced X cm each.

It can also be said that the length from the end portion 17 to the end portion 19 is an apparent length when the left rack 5 and the right rack 6 are seen as an integral member. In other words, the user 2 can adjust the apparent length of the left rack 5 and the right rack 6.

Besides these, an arbitrary mechanism with which the length between the end portions can be adjusted may be adopted. For example, the left rack 5 and the right rack 6 may be connected by a member other than the pinion gear 27, and the length between the end portions may be adjusted by the drive of the member. Alternatively, the length between the end portions may be adjustable by, for example, an operation to a button, a switch, a dial, or the like.

[Adjustment of Band Length]

Figure 7:
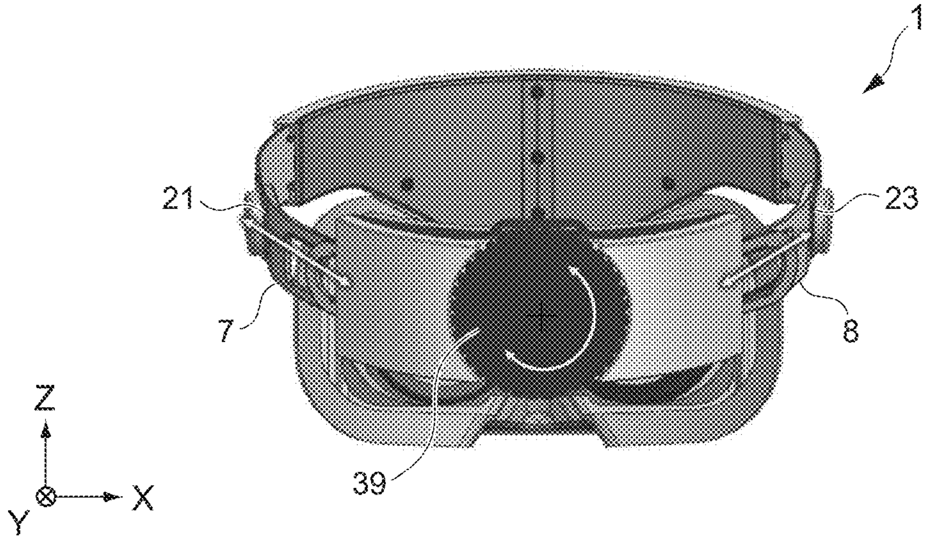
FIG. 7 Schematic diagrams each showing a length adjustment of a left band and a right band in the rear housing.
Figure 7:
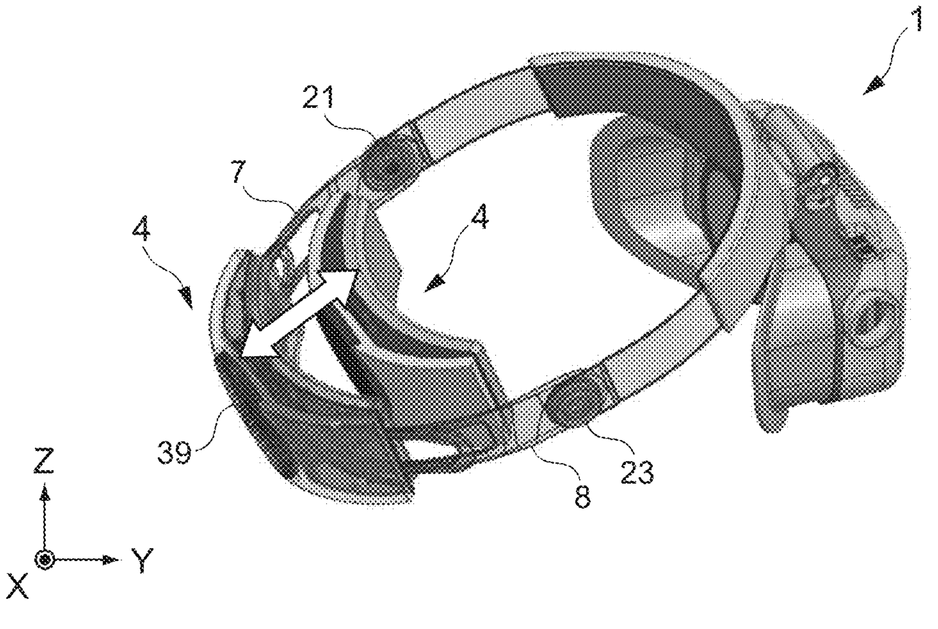

FIG. 7 are schematic diagrams each showing a length adjustment of the left band 7 and the right band 8 in the rear housing 4. FIG. 7A shows a state where the head-mounted display 1 is seen from the rear side. FIG. 7B shows a state where the head-mounted display 1 is seen from the right side.

In the present embodiment, a length from the end portion 21 of the left band 7 to the end portion 23 of the right band 8 can be adjusted by the pinion gear 38. Specifically, when the rear dial 39 is rotated by the user 2, the pinion gear 38 rotates, and the left band 7 and the right band 8 move. Thus, the length from the end portion 21 to the end portion 23 changes. In other words, by rotating the rear dial 39, the user 2 can adjust the apparent length of the left band 7 and the right band 8.

Also in the present embodiment, similar to the case of adjusting the length of the left rack 5 and the right rack 6, a distance from the pinion gear 38 to the end portion 21 and a distance from the pinion gear 38 to the end portion 23 are synchronized (a state where the distances are equal is constantly maintained). Of course, a specific configuration is not limited, and an arbitrary configuration may be adopted.

In FIG. 7A, a rotation direction of the rear dial 39 and movement directions of the left band 7 and the right band 8 are indicated by arrows. For example, when the rear dial 39 is rotated clockwise in FIG. 7A (counterclockwise in FIG. 4), the pinion gear 38 rotates counterclockwise in FIG. 4. At this time, since the downward teeth of the left band 7 are engaged with the teeth at the upper portion of the pinion gear 38, the left band 7 moves toward the right side (the positive side of the X axis in FIG. 4). Conversely, the right band 8 moves toward the left side. In other words, the distance between the end portions becomes shorter.

FIG. 7B schematically shows a state where the rear housing 4 moves along with the adjustment of the distance between the end portions. When the distance between the end portions becomes shorter, the entire rear housing 4 moves toward the front side (the positive side of the Y axis). Conversely, when the rear dial 39 is rotated clockwise in FIG. 5A, the distance between the end portions becomes longer, and the rear housing 4 moves toward the rear side. In this manner, by rotating the rear dial 39, the user 2 can adjust the position of the rear housing 4. Besides these, an arbitrary mechanism with which the length between the end portions can be adjusted may be adopted without being limited to the rear dial 39 and the pinion gear 38.

[Folding of Head-Mounted Display]

Figure 8:
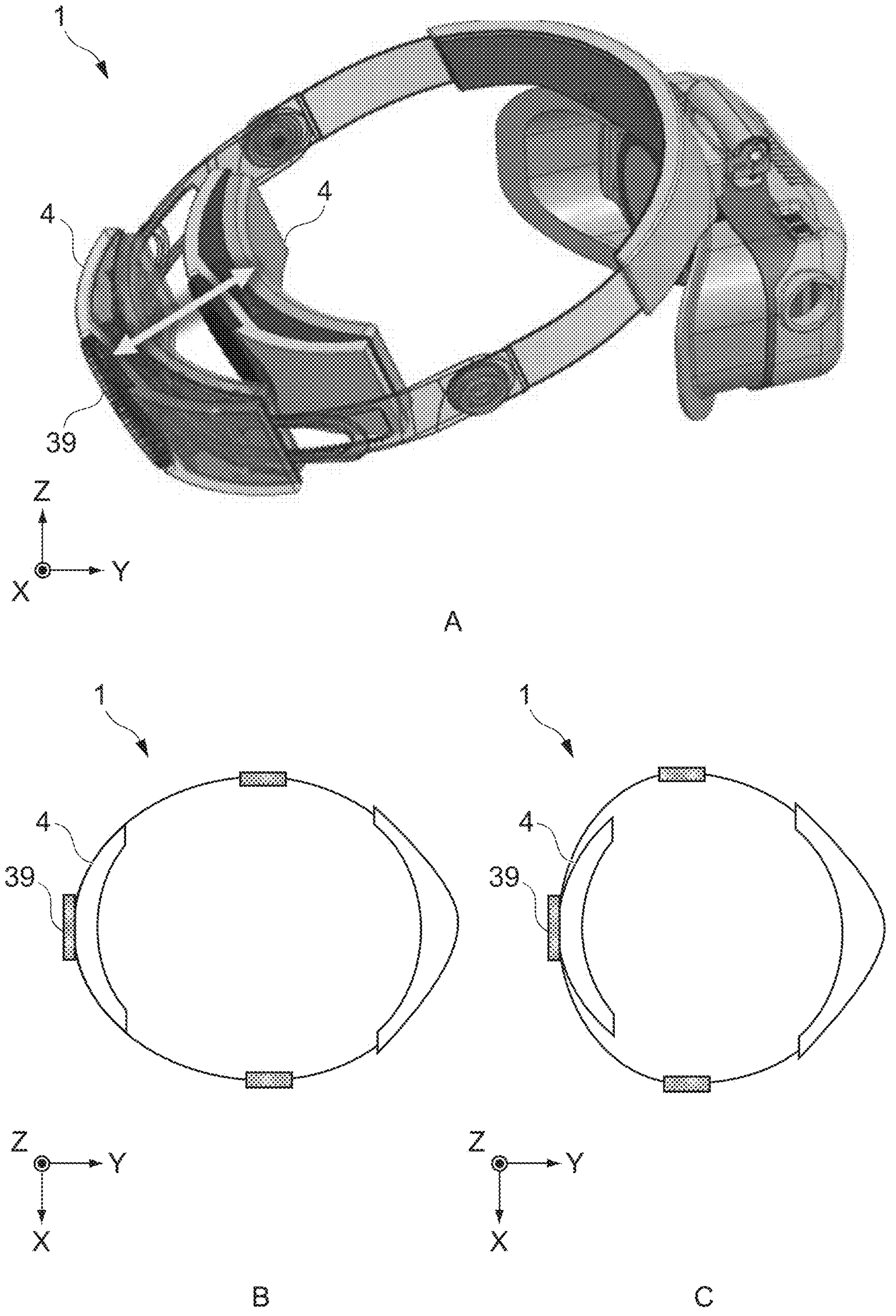
FIG. 8 Schematic diagrams each showing a folding operation of the head-mounted display.
Figure 9:
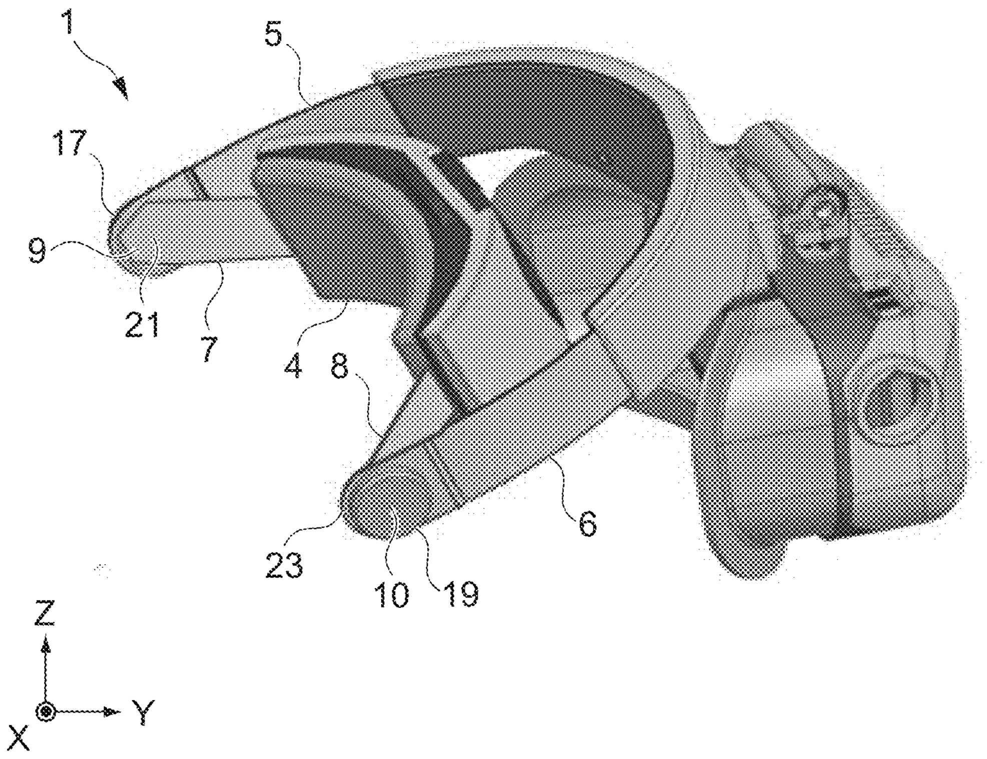
FIG. 9 Schematic diagrams each showing the folding operation of the head-mounted display.
Figure 9:
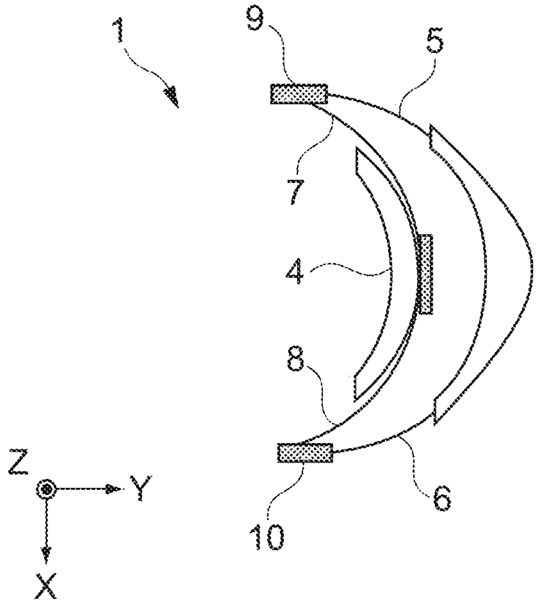
Figure 10:
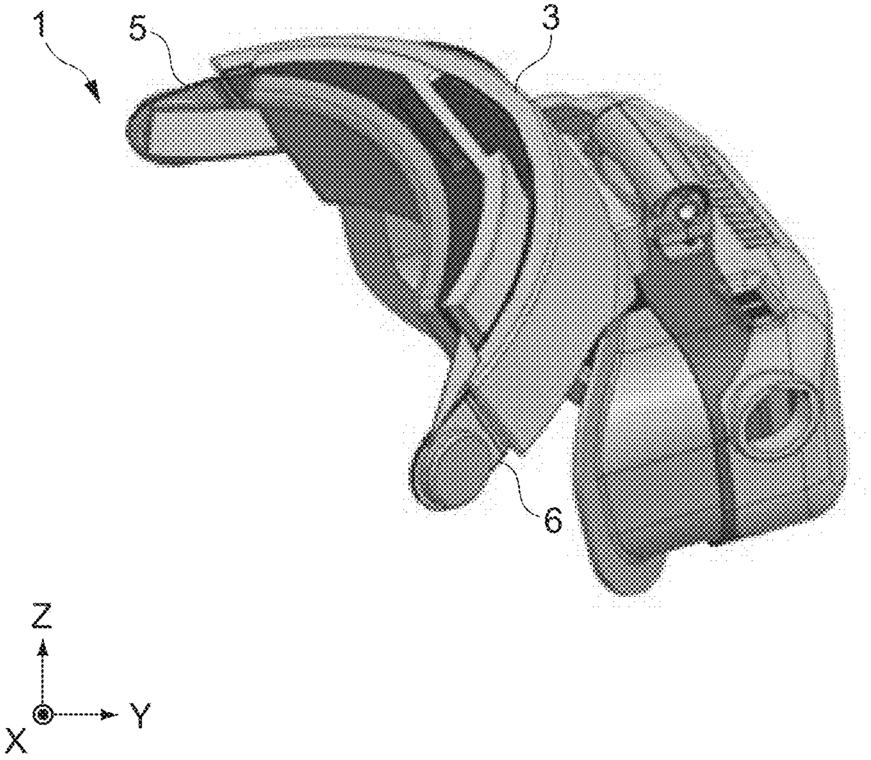
FIG. 10 Schematic diagrams each showing the folding operation of the head-mounted display.
Figure 10:
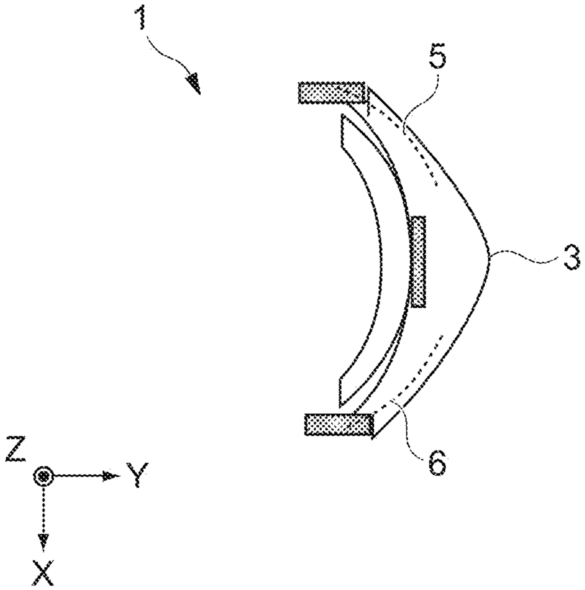

FIGS. 8 to 10 are schematic diagrams each showing a folding operation of the head-mounted display 1. FIGS. 8A, 9A, and 10A each show a state where the head-mounted display 1 is seen from the right side. FIGS. 8B, 8C, 9B, and 10B each show a state where the head-mounted display 1 is seen from the upper side. FIG. 8B is a diagram schematically showing a state where the rear housing 4 is positioned on the rear side in FIG. 8A. Further, FIG. 8C is a diagram schematically showing a state where the rear housing 4 has moved toward the front side. FIG. 9B is a diagram schematically showing the state of FIG. 9A. FIG. 10B is a diagram schematically showing the state of FIG. 10A.

In the present embodiment, the rear housing 4 can be accommodated on the inner side of the front housing 3 by the rotation of the front housing 3 and the rear housing 4 that uses the left hinge 9 and the right hinge 10 as rotation centers. The accommodation of the rear housing 4 corresponds to the folding of the head-mounted display 1. Specifically, first, when the user 2 operates the rear dial 39 in the state where the rear housing 4 is positioned on the rear side in FIG. 8A (the state shown in FIG. 8B), the rear housing 4 is set to a state where it has moved toward the front side (the state shown in FIG. 8C).

Next, the rear housing 4 is rotated 180 degrees by the user 2 to be set to the state shown in FIG. 9. In the present embodiment, the end portion 17 of the left rack 5 and the end portion 21 of the left band 7 are rotatably connected by the left hinge 9. In addition, the end portion 19 of the right rack 6 and the end portion 23 of the right band 8 are rotatably connected by the right hinge 10. Thus, the left rack 5 and the right rack 6 and the left band 7 and the right band 8 are rotatably connected while using the left hinge 9 and the right hinge 10 as the rotation centers.

When the user 2 rotates the rear housing 4, the left band 7 also rotates about the left hinge 9. In other words, a relative angle of the left band 7 and the left rack 5 about the left hinge 9 changes. Similarly, a relative angle of the right band 8 and the right rack 6 about the right hinge 10 changes. In other words, the left band 7 and the left rack 5 and the right band 8 and the right rack 6 rotate while respectively using the left hinge 9 and the right hinge 10 as the rotation centers.

Further, also when the front housing 3 alone is rotated without changing the position of the rear housing 4, the relative angle changes similarly, and rotations that use the left hinge 9 and the right hinge 10 as the rotation centers are realized. Alternatively, also when the front housing 3 and the rear housing 4 are rotated at the same time, the rotations that use the left hinge 9 and the right hinge 10 as the rotation centers are realized.

Furthermore, a relative angle of the front housing 3 and the rear housing 4 about the left hinge 9 and the right hinge 10 also changes. In other words, it can be said that the front housing 3 and the rear housing 4 also rotate while using the left hinge 9 and the right hinge 10 as the rotation centers. That is, the front housing 3 and the rear housing 4 are connected by the left rack 5, the right rack 6, the left band 7, the right band 8, the left hinge 9, and the right hinge 10 so as to become rotatable while using the left hinge 9 and the right hinge 10 as the rotation centers.

Besides these, an arbitrary connection method that enables the front housing 3 and the rear housing 4 to be connected so as to become relatively rotatable while using the hinges as the rotation centers may be adopted. For example, portions of the racks and bands other than the end portions may be connected by the hinges. Alternatively, the front housing 3 and the rear housing 4 may be connected by members other than the racks and bands.

Next, the user 2 pushes the left rack 5 and/or the right rack 6 into the front housing 3 so that the left rack 5 and the right rack 6 are inserted into the front housing 3 to be set to the state shown in FIG. 10. Alternatively, it is also possible to insert the left rack 5 and the right rack 6 into the front housing 3 by an operation of pushing the rear housing 4 toward the front side.

The head-mounted display 1 is folded by such procedures. In the folded state (FIG. 10), the rear housing 4 is positioned on an inner side (the negative side of the Y axis) of the front housing 3. In other words, while the head-mounted display 1 roughly has a ring shape in the unfolded state, the rear housing 4 is positioned in a direction corresponding to an inner side of the ring shape. In addition, in the folded state (FIG. 10), a volume of the head-mounted display 1 becomes smaller than that of the unfolded state (FIG. 8). A specific method for the folding is not limited, and an arbitrary method such as a method in which the folding is executed automatically by an operation to a button, a switch, or the like may be adopted, for example.

In other words, it can also be said that the state where the rear housing 4 is accommodated on the inner side of the front housing 3 is a state where the front housing 3 and the rear housing 4 overlap. Similarly, it can also be said that the folded state is a state where the front housing 3 and the rear housing 4 overlap.

Further, it is also possible to cause the head-mounted display 1 to return to the unfolded state by reverse procedures (FIG. 10→FIG. 9→FIG. 8). In other words, it is possible to cause the head-mounted display 1 to return to the unfolded state by procedures of pulling the left rack 5 and the right rack 6 to draw them out from the front housing 3, rotating the rear housing 4 180 degrees, and moving the rear housing 4 toward the rear side by an operation to the rear dial 39.

[Stopper]

Figure 11:
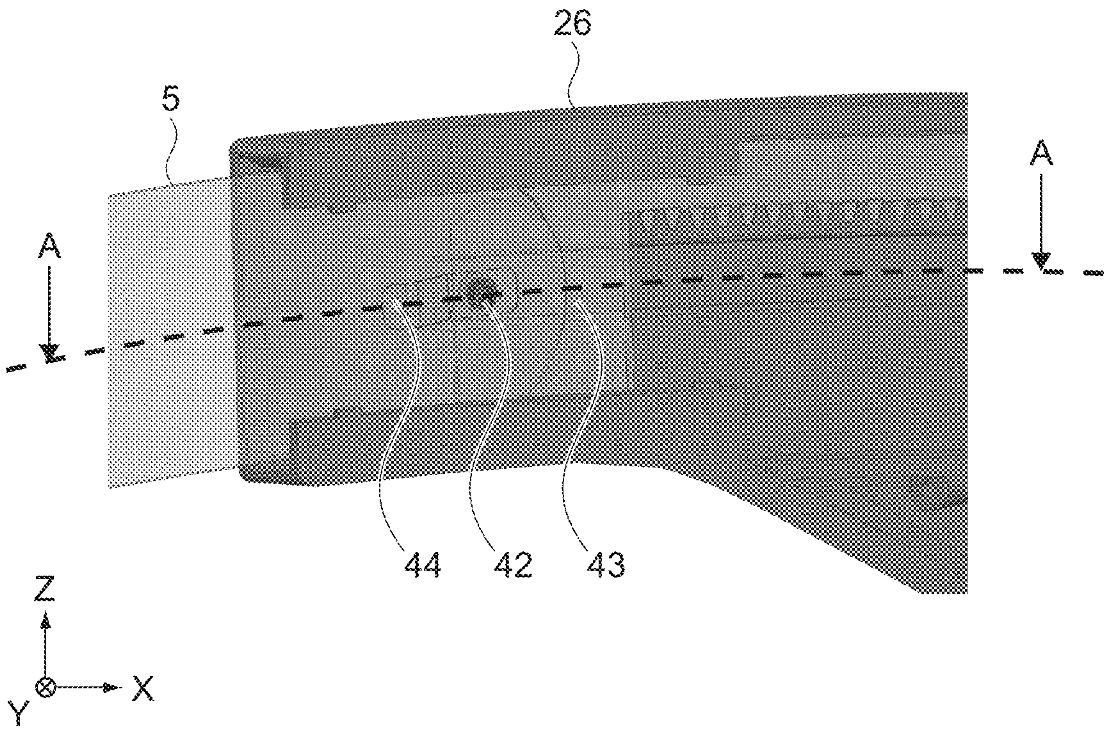
FIG. 11 Schematic diagrams each showing a configuration example of a stopper.
Figure 11:
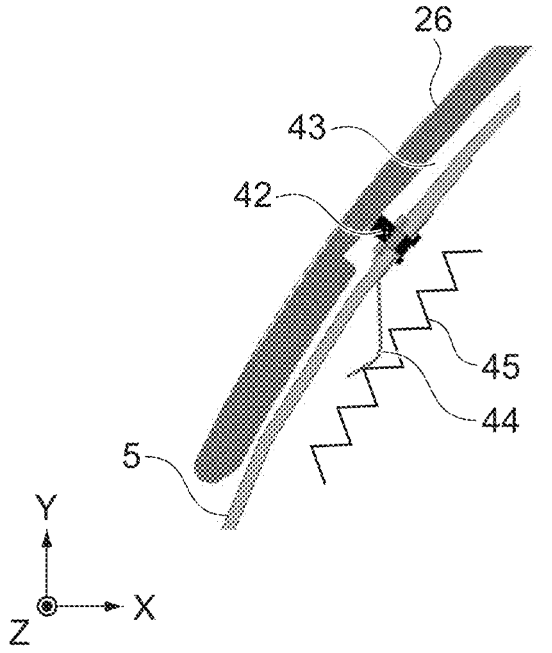

FIG. 11 are schematic diagrams each showing a configuration example of a stopper. FIG. 11A shows a state where the front housing 3 and the left rack 5 are seen from the rear side. FIG. 11B is a cross-sectional view taken along the line A-A of FIG. 11A. It is noted that FIG. 11 show only the front half (front cover 26) of the front housing 3.

In the present embodiment, the left rack 5 includes a stopper 42 which restricts detachment of the left rack 5 from the front housing 3. Specifically, a screw is connected to the left rack 5 as the stopper 42. The stopper 42 is connected such that a tip end thereof protrudes from the front-side (the positive side of the Y axis) surface of the left rack 5. Further, the front cover 26 includes a rectangular concave portion 43 on the rear-side surface thereof. The tip end of the stopper 42 is abutted against the concave portion 43 of the front cover 26.

For example, when the left rack 5 is pulled toward the left side in the state shown in FIG. 11, the stopper 42 also moves toward the left side to eventually get stuck on a left side surface of the concave portion 43, and thus can move no more toward the left side. Thus, also the left rack 5 can move no more toward the left side. In other words, a situation where the left rack 5 completely comes off from the front housing 3 since the left rack 5 has moved too much toward the left side will not occur.

Furthermore, since the movements of the left rack 5 and the right rack 6 are synchronized, when the movement of the left rack 5 stops, the movement of the right rack 6 also stops at the same time, and thus a situation where the right rack 6 completely comes off from the front housing 3 also will not occur.

In other words, the stopper 42 restricts a change of the distance from the pinion gear 27 to the end portion 17 of the left rack 5 so that the distance from the pinion gear 27 to the end portion 17 does not become larger than a predetermined length. In the present example, a distance from the pinion gear 27 to the side surface of the concave portion 43 corresponds to the predetermined length.

Further, it can also be said that the change of the distance is restricted so that the insertion amount does not become smaller than the predetermined length. Alternatively, it can also be said that the change of the distance is restricted so that the exposure amount does not become larger than the predetermined length. A specific value of the predetermined length is not limited, and an arbitrary value may be used.

A specific configuration including the position of the stopper 42, the shape of the concave portion 43, and the like is not limited. Moreover, an arbitrary method for restricting the detachment of the left rack 5 and the right rack 6, such as a configuration that uses the stopper 42 other than the screw and a configuration in which the stopper 42 is connected to the right rack 6, may be adopted. Conversely, the stopper 42 which restricts the movement of the left rack 5 may be provided so that the insertion amount of the left rack 5 does not become larger than the predetermined length (does not move too much toward the right side). The stopper 42 corresponds to an embodiment of a restriction portion according to the present technology.

[Click Mechanism]

In the present embodiment, a click mechanism for imparting a sense of click when moving the left rack 5 is provided. Specifically, a leaf spring 44 is connected to the left rack 5. The leaf spring 44 is screwed to the rear-side surface of the left rack 5 by the stopper 42 (screw). Moreover, a stepped portion 45 is formed on the front-side surface inside the front housing 3. FIG. 11B schematically shows the stepped portion 45.

A tip end of the leaf spring 44 is in contact with the stepped portion 45, and when the left rack 5 moves, a force that the leaf spring 44 receives from the stepped portion 45 changes periodically along with the change of the position of the leaf spring 44. Accordingly, a force requisite for moving the left rack 5 also changes periodically. Thus, the user 2 feels the sense of click when moving the left rack 5.

Specific configurations including the shape, position, and connection method of the leaf spring 44, the shape of the stepped portion 45, and the like are not limited. In addition, the click mechanism may be formed by members other than the leaf spring 44 and the stepped portion 45.

[Flexible Substrate]

Figure 12:
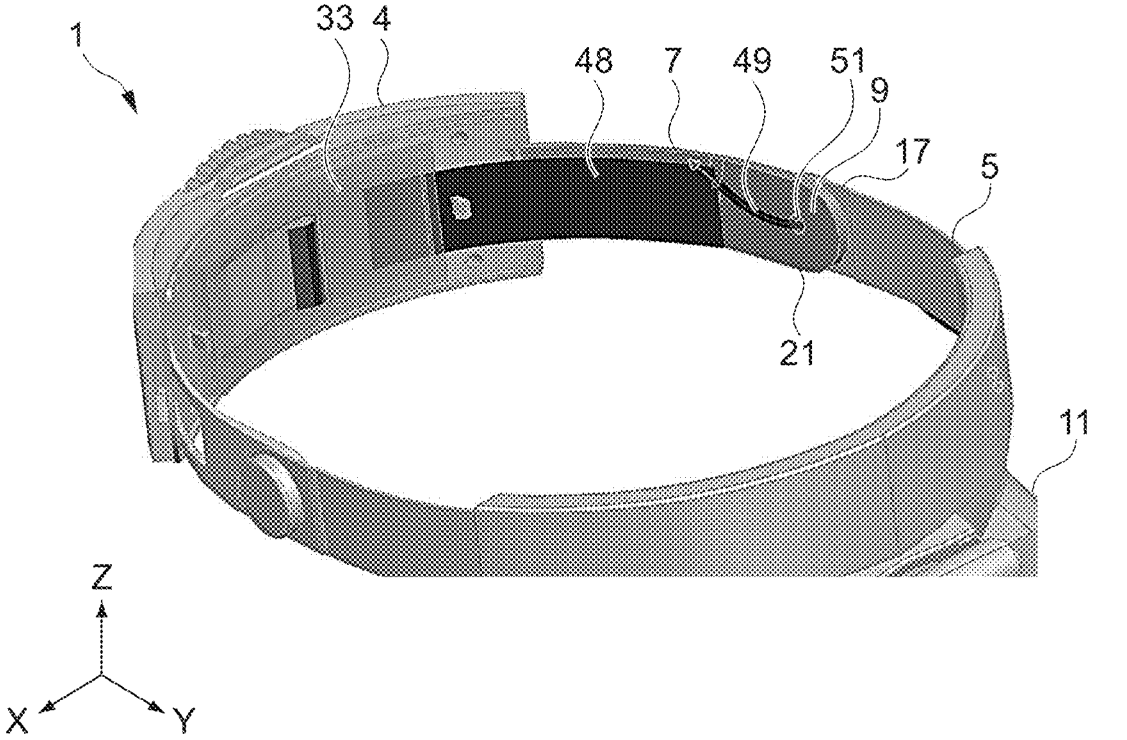
FIG. 12 Schematic diagrams each showing a configuration example of a flexible substrate.
Figure 12:
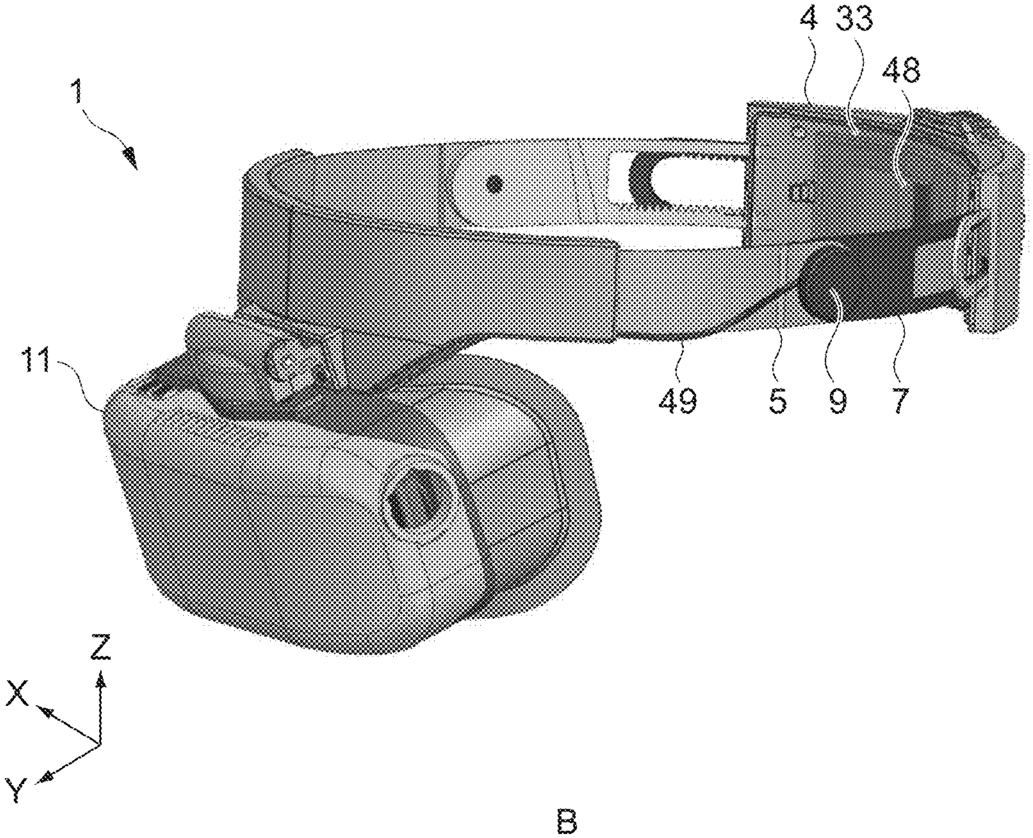
Figure 13:
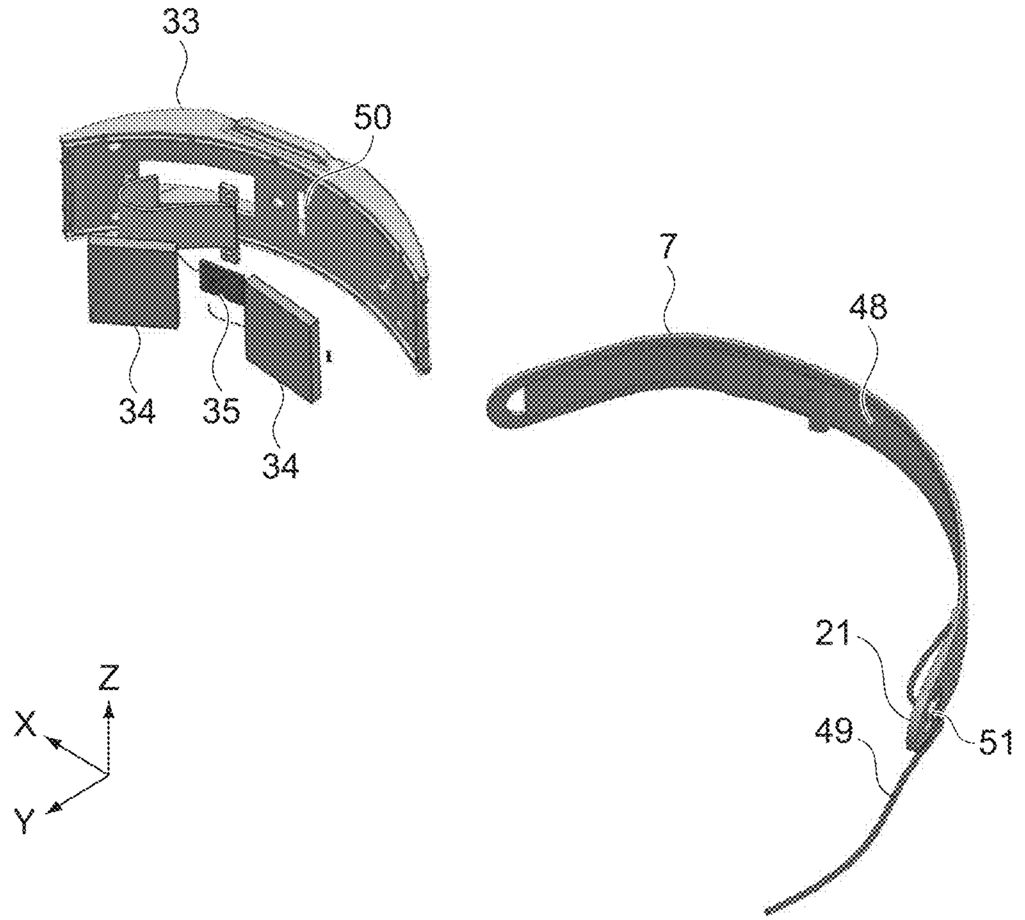
FIG. 13 An exploded view showing the configuration example of the flexible substrate.

FIG. 12 are schematic diagrams each showing a configuration example of a flexible substrate. FIG. 12A shows a state where the head-mounted display 1 is seen from the diagonally forward right side. FIG. 12B shows a state where the head-mounted display 1 is seen from the diagonally forward left side. FIG. 13 is an exploded view showing the configuration example of the flexible substrate.

In the present embodiment, the head-mounted display 1 includes a flexible substrate 48 and a harness 49 which are arranged in the left band 7 and the left rack 5 and electrically connect the display unit 11 and the substrate 35. The flexible substrate 48 is a rectangular band-shaped substrate and is arranged along the front-side surface of the left band 7. Specifically, in the state where the flexible substrate 48 is arranged, the flexible substrate 48 includes a right (the positive side of the X axis) end portion and a front (the positive side of the Y axis) end portion.

It is noted that although the left band 7 and the right band 8 are hollow in the example shown in FIG. 4 and the like, when the flexible substrate 48 is arranged in the left band 7, the left band 7 that is not hollow as shown in FIGS. 12 and 13 is used. Of course, it is also possible to use the hollow left band 7 and right band 8 in the case where the flexible substrate 48 is not arranged, and the like.

The rear cover 33 is provided with an opening 50 for the flexible substrate 48 to pass through. A right (the positive side of the X axis) end portion of the flexible substrate 48 is folded inside the rear housing 4, and a tip end is exposed on the front side of the rear housing 4 from the opening 50 to be connected to the substrate 35 arranged on the front-side surface of the rear cover 33. It is noted that in FIG. 12, the rear cover 33 is illustrated transparently so that a portion of the flexible substrate 48 that is positioned inside the rear housing 4 can be seen. In addition, the illustration of the opening 50 is omitted.

Further, the left hinge 9, the end portion 17 of the left rack 5, and the end portion 21 of the left band 7 are each provided with an opening 51 for the harness 49 to pass through. The harness 49 has one end portion thereof connected to the front end portion of the flexible substrate 48, is arranged along the front-side surface of the left band 7, passes through the opening 51, and is arranged along the front-side surface of the left rack 5. The other end portion of the harness 49 (the end portion on the side not connected to the flexible substrate 48) is connected to the display unit 11.

In other words, the substrate 35 and the display unit 11 are electrically connected by the flexible substrate 48 and the harness 49. In addition, since the substrate 35 is electrically connected to the batteries 34, the batteries 34 and the display unit 11 are electrically connected. Accordingly, power is supplied from the batteries 34 to the display unit 11. Thus, display of videos by the display unit 11 becomes possible.

Specific configurations of the flexible substrate 48 and the harness 49 including the type, the shape, the arrangement, and the like are not limited. For example, the flexible substrate 48 and the harness 49 may be arranged with respect to the right rack 6 and the right band 8. Alternatively, the electrical connection may be realized by the flexible substrate 48 alone without using the harness 49. Alternatively, the electrical connection may be realized by the harness 49 alone. It is noted that the “electrical connection” includes an arbitrary connection form for electrically connecting various members. For example, electrically connecting various members via a circuit configuration including the substrate 35, the flexible substrate 48, and the like is included in the “electrical connection”.

The harness 49 corresponds to an embodiment of a cable according to the present technology.

An electrical connection portion according to the present technology is realized by the flexible substrate 48 and the harness 49.

Alternatively, the electrical connection may be realized by arbitrary members other than the flexible substrate 48 and the harness 49. Alternatively, mechanisms other than the substrate 35 and the display unit 11 may be electrically connected to each other.

[Configuration of Electric Circuit]

An example of a configuration of an electric circuit in the head-mounted display 1 will be described. For example, a connector may be arranged in the rear housing 4, and the cable and the like (the flexible substrate 48, the harness 49, and the like) and the substrate 35 may be connected via the connector. Of course, the cable and the like may be electrically connected directly to the substrate 35 without using the connector.

Similarly, the cable and the like and the display (display unit 11) may be connected via the connector. In this case, for example, a substrate, a connector connected to the substrate, a processor connected to the substrate, and a display connected to the substrate are arranged in the front housing 3. Then, by connecting the cable and the like and the connector, the electrical connection of the cable and the like and the display is realized. Of course, a specific electrical configuration in the front housing 3 is not limited. Alternatively, the cable and the like may be electrically connected directly to the substrate and the display without using the connector.

[Sub-Cover]

Figure 14:
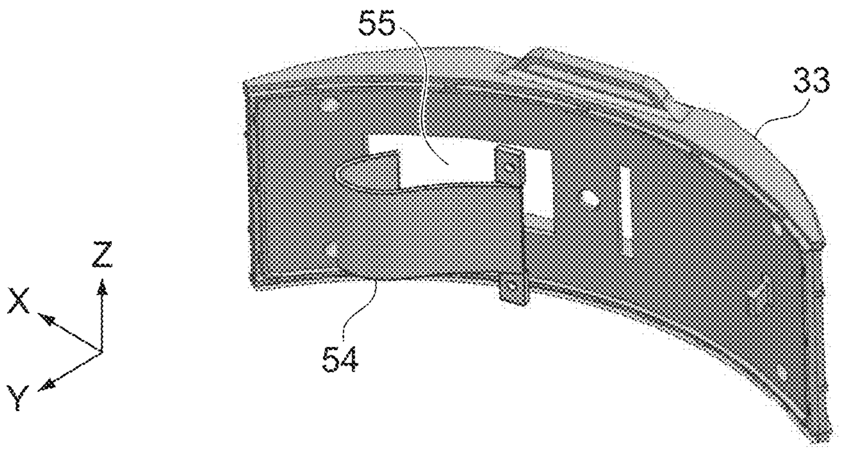
FIG. 14 Schematic diagrams each showing a configuration example of a sub-cover.
Figure 14:
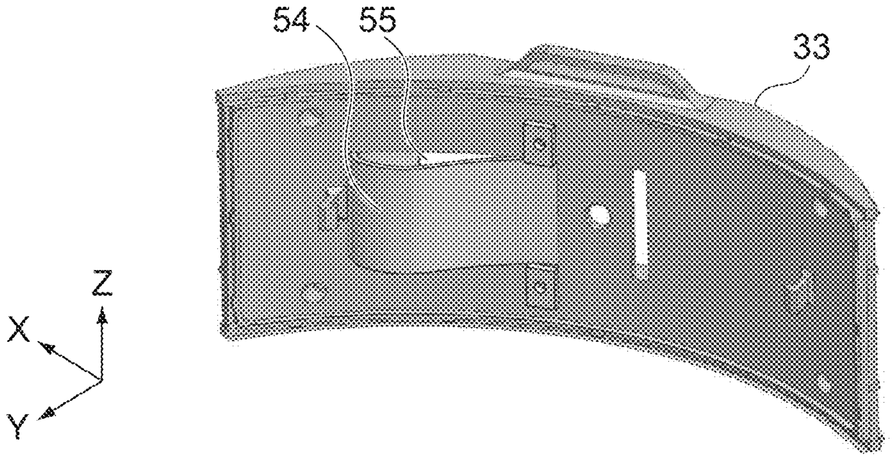
Figure 14:
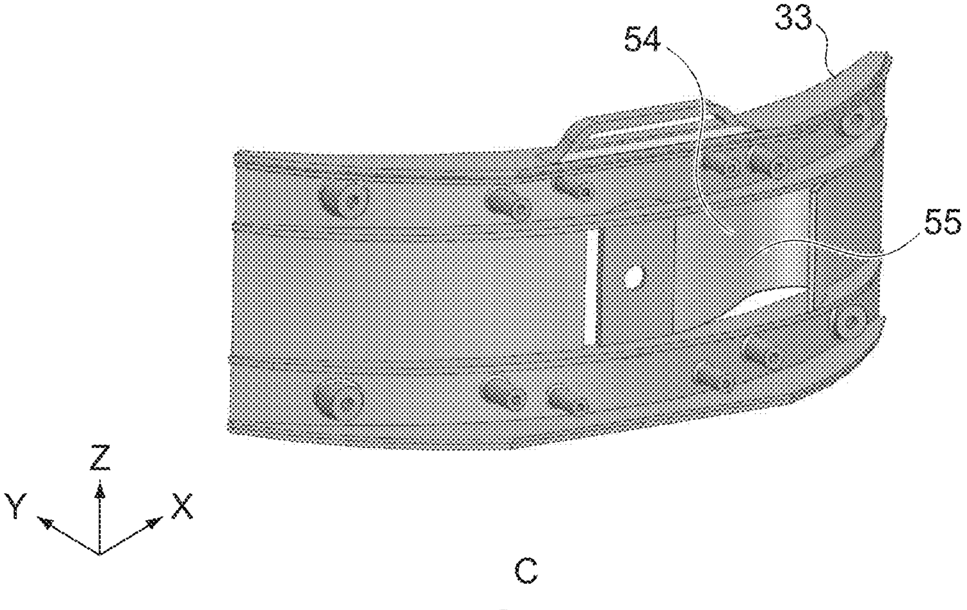
Figure 15:
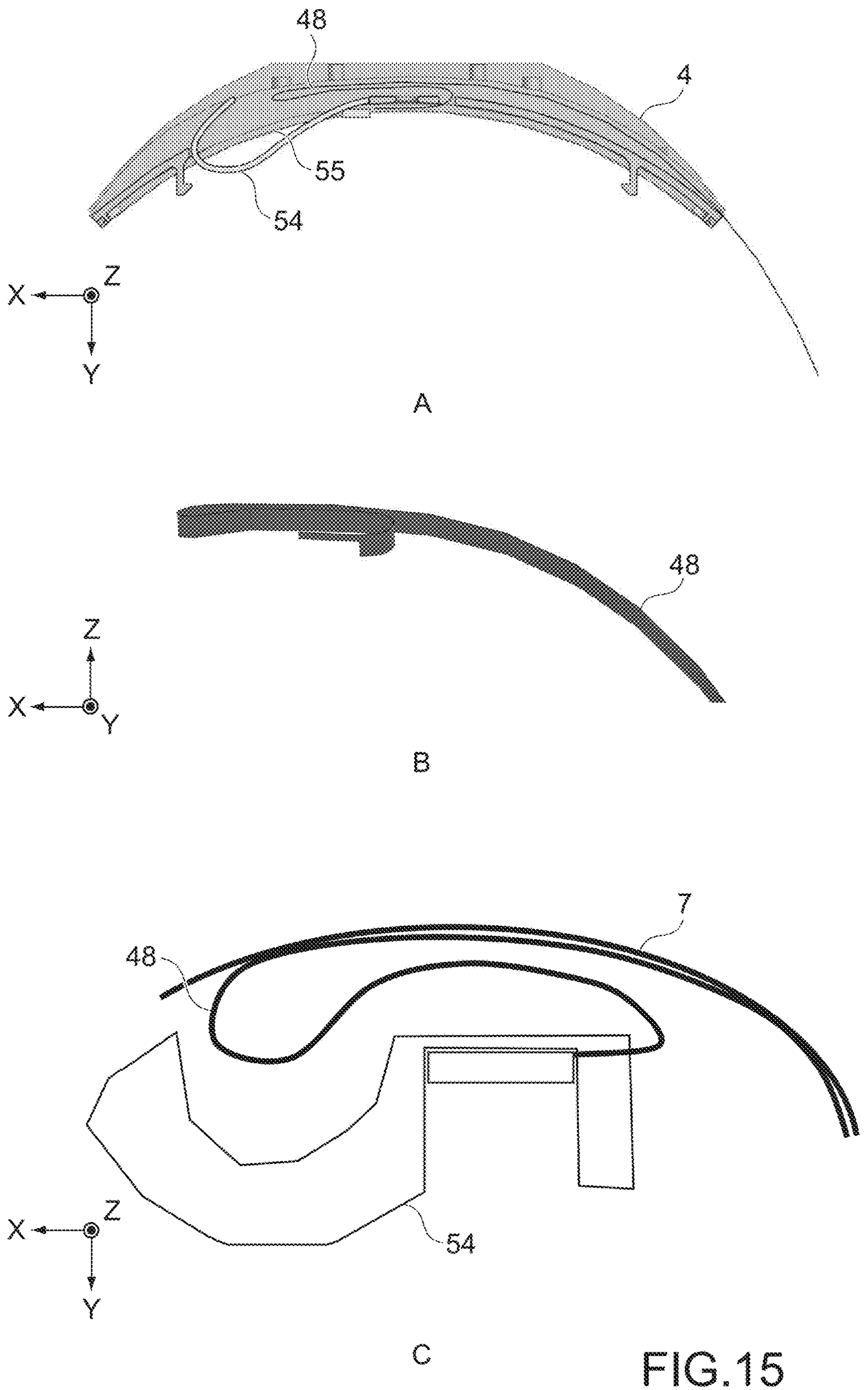
FIG. 15 Schematic diagrams each showing the configuration example of the sub-cover.
Figure 16:
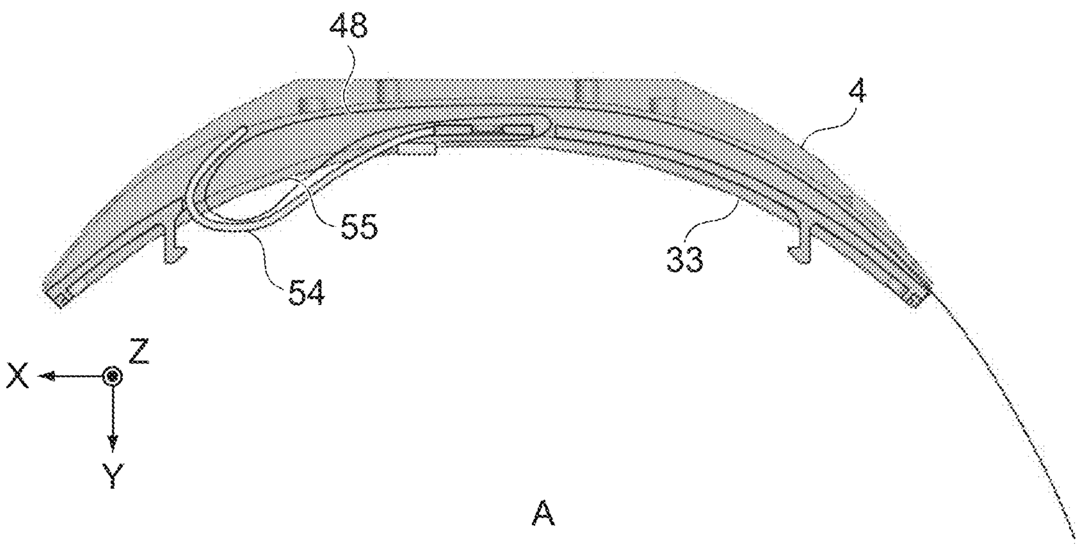
FIG. 16 Schematic diagrams each showing the configuration example of the sub-cover.
Figure 16:
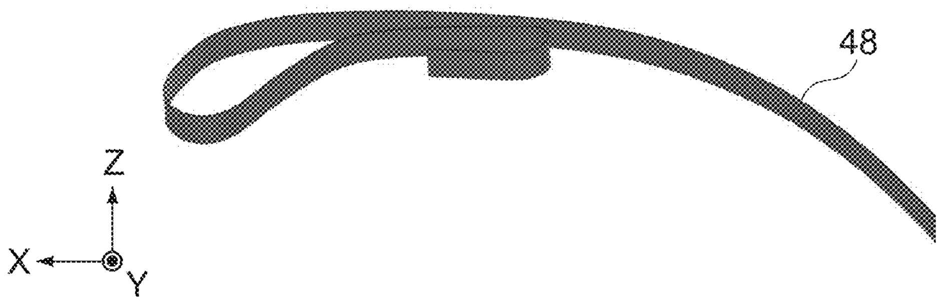
Figure 16:
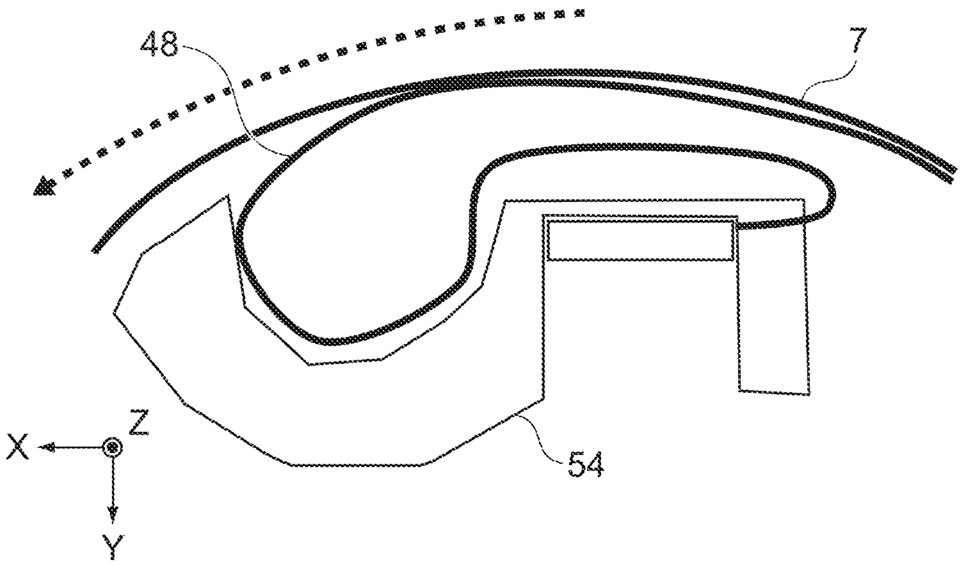

FIGS. 14 to 16 are schematic diagrams each showing a configuration example of a sub-cover. FIGS. 14A and 14B each show a state where the rear cover 33 and a sub-cover 54 are seen from the diagonally forward left side. FIG. 14C shows a state where the rear cover 33 and the sub-cover 54 are seen from the diagonally backward left side. It is noted that FIG. 14A shows a state where the sub-cover 54 is removed, and FIGS. 14B and 14C each show a state where the sub-cover 54 is connected to the rear cover 33.

FIGS. 15A and 16A each show a state where the rear housing 4, the flexible substrate 48, and the sub-cover 54 are seen from the upper side. FIGS. 15B and 16B each show a state where the flexible substrate 48 is seen from the front side. FIGS. 15C and 16C each schematically show a state where the left band 7, the flexible substrate 48, and the sub-cover 54 are seen from the upper side. It is noted that FIGS. 15A to 15C show the flexible substrate 48 in the same state, and FIGS. 16A to 16C also show the flexible substrate 48 in the same state.

In the present embodiment, the flexible substrate 48 is deformed along with the adjustment of the length from the end portion 21 of the left band 7 to the end portion 23 of the right band 8 by the pinion gear 38. FIG. 16 each show a state where the left band 7 has moved toward the right side (the positive side of the X axis) from the state shown in FIG. 15. Before the left band 7 moves (FIG. 15), the folded portion of the flexible substrate 48 is roughly a small circle. When the left band 7 moves toward the right side, the flexible substrate 48 is squeezed toward the right side (the positive side of the X axis), and after the movement (FIG. 16), the folded portion becomes a large circle. In this manner, the flexible substrate 48 is deformed when the left band 7 is moved for adjusting the length from the end portion 21 to the end portion 23.

Also in the present embodiment, the deformed flexible substrate 48 is accommodated in the sub-cover 54. As shown in FIG. 14, the sub-cover 54 has a rectangular band shape in which one end portion thereof is folded roughly in a circular shape. Two screw holes are formed at an end portion of the sub-cover 54 on a side that is not folded, and the sub-cover 54 is fastened to the front-side surface of the rear cover 33 by screwing. Further, the rear cover 33 is formed with a rectangular opening 55, and the sub-cover 54 is arranged such that the folded portion (the end portion on the folded side) enters the inner portion of the rear housing 4 from the opening 55.

When the folded portion of the flexible substrate 48 becomes larger, the entire folded portion is eventually abutted along the inner surface of the sub-cover 54 as shown in FIGS. 16A and 16C. In this manner, the flexible substrate 48 is accommodated in the sub-cover 54.

The sub-cover 54 is formed of, for example, a material having rigidity such as metal and plastic. Thus, even when a force acts on the sub-cover 54 by the deformation of the flexible substrate 48, a situation where the unfixed portion (folded portion) of the sub-cover 54 moves will not occur. Alternatively, it is possible to adopt a configuration in which also the folded portion is fixed by fastening using screws or the like, a configuration in which the folded portion is fixed by devising the shape of the opening 55, a configuration in which the rear cover 33 and the sub-cover 54 are formed integrally, or the like.

The circular shape of the folded portion of the sub-cover 54 may also be referred to as an R shape or the like. Besides these, a specific configuration of the sub-cover 54 including the shape, the material, the arrangement, the fixing method with respect to the rear cover 33, and the like is not limited. The sub-cover 54 corresponds to an embodiment of an accommodation member according to the present technology.

[Hinge]

Figure 17:
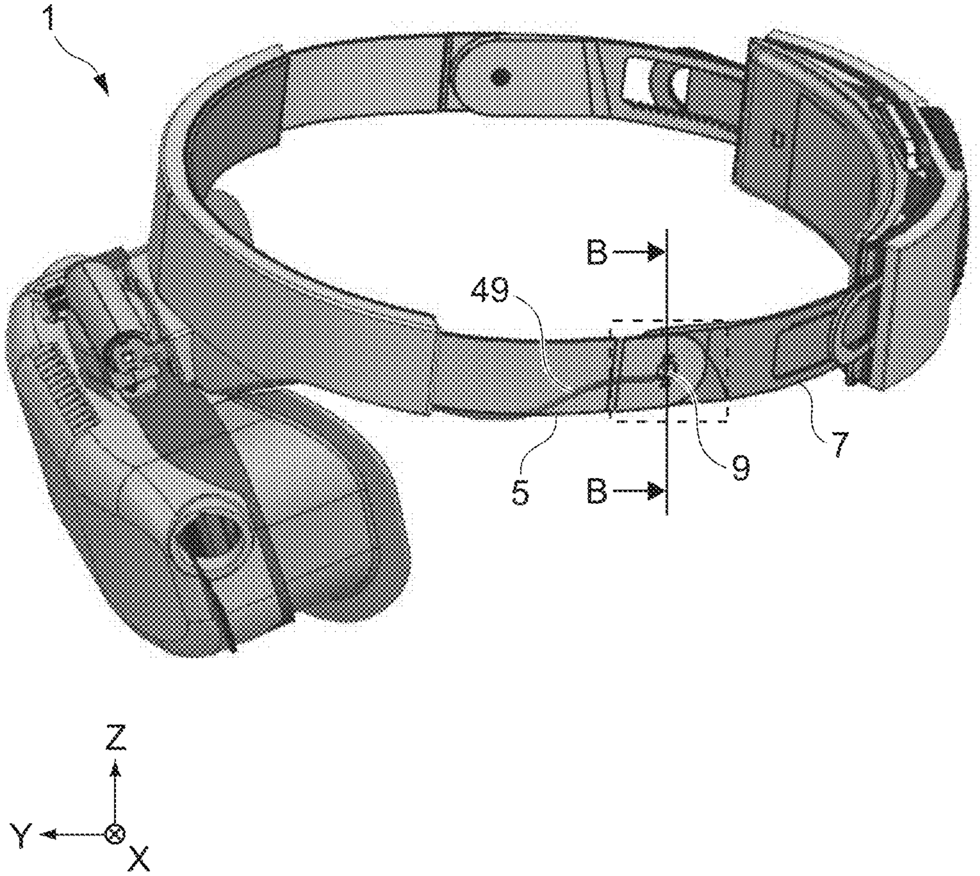
FIG. 17 A schematic diagram showing a configuration example of a hinge.
Figure 18:
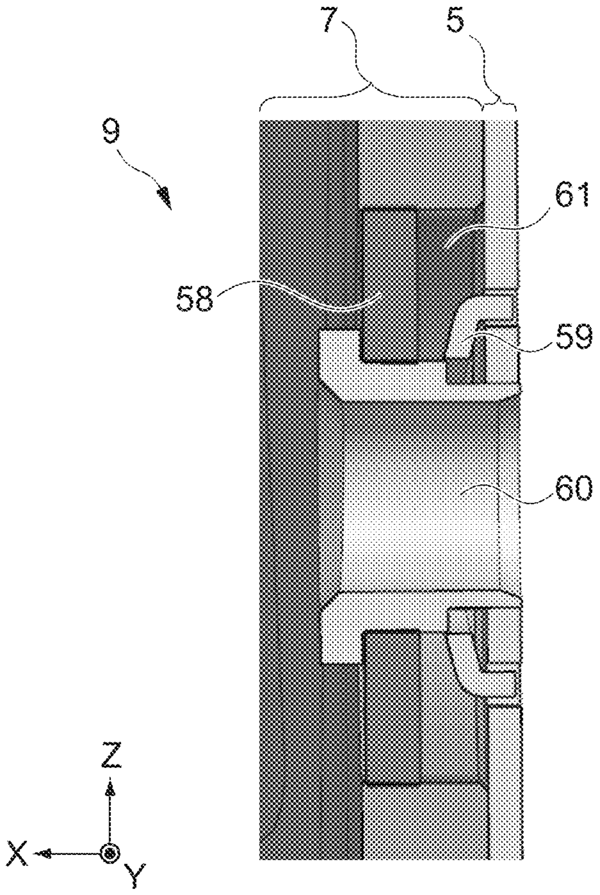
FIG. 18 Schematic diagrams each showing the configuration example of the hinge.
Figure 18:
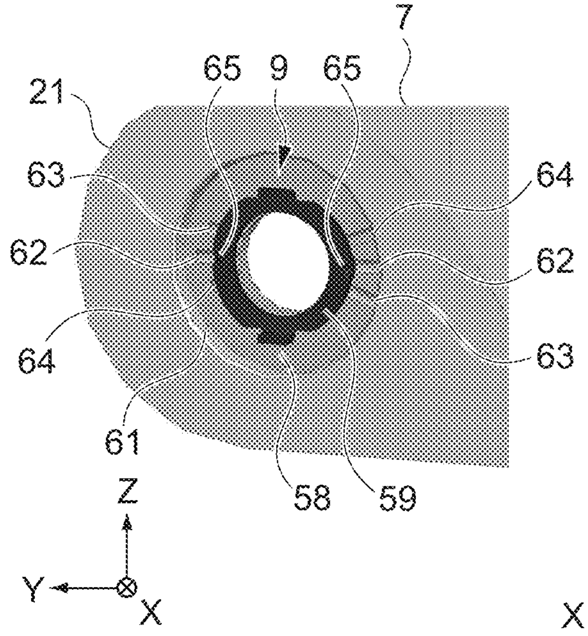
Figure 18:
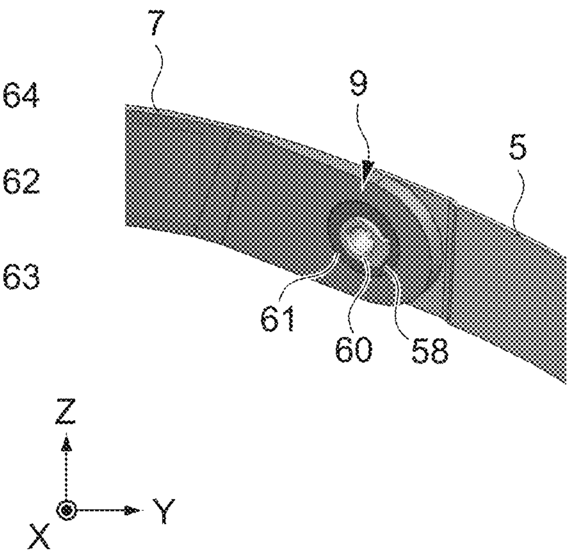

FIGS. 17 and 18 are schematic diagrams each showing a configuration example of the hinge. FIG. 18 each show the vicinity of the left hinge 9 (a rectangular portion indicated by broken lines in FIG. 17). FIG. 18A is a cross-sectional view taken along the line B-B of FIG. 17. FIG. 18B shows a state where the end portion 21 of the left band 7 is seen from the left side (the negative side of the X axis). FIG. 18C shows a state where the left rack 5 and the left band 7 is seen from the right side.

In the present embodiment, the relative rotation angle of the front housing 3 and the rear housing 4 about the left hinge 9 and the right hinge 10 is fixed at a predetermined angle by the left hinge 9 and the right hinge 10. Specifically, the left hinge 9 and the right hinge 10 include a mechanism for fixing the rotation angle.

The left hinge 9 includes a rear band plate 58, a leaf spring 59, and an axial pin 60. The rear band plate 58 is a member having a ring shape. An opening 61 for attaching the left hinge 9 is formed at the end portion 21 of the left band 7, and the rear band plate 58 is fit into and fixed to the opening 61. Positioning grooves are formed on a left (the negative side of the X axis) surface of the rear band plate 58.

The positioning grooves are grooves for positioning the leaf spring 59. In the present embodiment, when the upper side (the positive side of the Z axis) of the rear band plate 58 is assumed to be the direction of 12 o'clock, positioning grooves 62 are respectively formed in the direction of 3 o'clock and the direction of 9 o'clock. In addition, positioning grooves 63 are respectively formed at a position slightly deviated from the direction of 3 o'clock in the clockwise direction and a position slightly deviated from the direction of 9 o'clock in the clockwise direction. In addition, positioning grooves 64 are respectively formed at a position slightly deviated from the direction of 3 o'clock in the counterclockwise direction and a position slightly deviated from the direction of 9 o'clock in the counterclockwise direction.

The leaf spring 59 is a member having a ring shape. Two convex portions 65 are formed on one surface of the leaf spring 59. The two convex portions 65 are formed at positions opposing each other (positions that are deviated 180 degrees). The leaf spring 59 is arranged such that the convex portions 65 fit into any of the positioning grooves 62 to 64. Thus, the leaf spring 59 is positioned on the rear band plate 58. Further, a surface of the leaf spring 59 on a side where the convex portions 65 are not formed is fixed to the left rack 5. FIG. 18B shows a state where the convex portions 65 are fit into the positioning grooves 62 respectively formed in the direction of 3 o'clock and the direction of 9 o'clock.

The axial pin 60 is a cylindrical pin member. The rear band plate 58 and the leaf spring 59 include circular openings since they both have a ring shape, and the axial pin 60 is arranged so as to fit into the openings. Since the axial pin 60 is cylindrical, the axial pin 60 also includes a circular opening, and the harness 49 is passed through the opening of the axial pin 60 It is noted that the illustration of the axial pin 60 is omitted in FIG. 18B.

For example, as shown in FIG. 18B, when the convex portions 65 are positioned in the positioning grooves 62, an angular difference between the left rack 5 and the left band 7 becomes 180 degrees. In other words, an angular difference between the front housing 3 and the rear housing 4 also becomes 180 degrees. Further, when the convex portions 65 are positioned in the positioning grooves 63, the left band 7 and the rear housing 4 rotate more or less in the clockwise direction, and thus the angular difference (angular difference on the upper side) increases (e.g., 200 degrees). Furthermore, when the convex portions 65 are positioned in the positioning grooves 64, the left band 7 and the rear housing 4 rotate more or less in the counterclockwise direction, and thus the angular difference decreases (e.g., 165 degrees).

Meanwhile, since the convex portions 65 will not be positioned at positions other than the positions at which the positioning grooves 62 to 64 are formed, the angular difference will not be fixed at a halfway angle that is not the designed angle. In this manner, the relative rotation angle of the front housing 3 and the rear housing 4 are fixed at a plurality of predetermined angles. It is noted that in the present embodiment, a similar mechanism is also formed in the right hinge 10.

By adjusting the positions of the positioning grooves as appropriate, the value of the rotation angle and the number of rotation angles for fixing can be set arbitrarily. Besides these, specific configurations of the rear band plate 58, the leaf spring 59, and the axial pin 60 including the shape, the material, the type, the arrangement, and the like are not limited. A fixing mechanism according to the present technology is realized by the rear band plate 58, the leaf spring 59, and the axial pin 60.

Further, fixing of the rotation angle may be realized by other arbitrary methods without being limited to the method that uses the positioning grooves and the convex portions 65. For example, a configuration in which a favorable rotation angle can be set by the user 2 may be adopted. In this case, for example, the user 2 adjusts the front housing 3 and the rear housing 4 to a desired setting angle and saves the rotation angle (e.g., presses a save button, or the like). The rotation angle is detected by an electronic sensor and stored in a memory. Then, when the head-mounted display 1 is activated, the rotation angle is electrically fixed at the rotation angle. For example, a rotating motor or the like is provided in the left hinge 9 and the right hinge 10 so as to realize the electrical drive.

So far, in the head-mounted display 1 according to the present embodiment, the front housing 3 and the rear housing 4 are connected so as to be rotatable about the left hinge 9 and the right hinge 10. In addition, the display unit 11 and the substrate 35 are electrically connected. Thus, the convenience of the user 2 can be improved.

When the head-mounted display 1 is used outside the home or the like, the head-mounted display 1 is carried in a bag, for example. Downsizing of the head-mounted display 1 when not in use so as to enable the head-mounted display 1 to be accommodated even when the bag is small has become an issue.

In the present embodiment, the distance from the end portion 21 of the left band 7 to the end portion 23 of the right band 8 is adjusted by the pinion gear 38. In other words, the user 2 can operate the rear dial 39 to move the rear housing 4 toward the front side (FIG. 8). Thus, the head-mounted display 1 can be downsized when not in use.

Further, the front housing 3 and the rear housing 4 are connected so as to be capable of rotating relatively via the left hinge 9 and the right hinge 10. In other words, the user 2 can fold the head-mounted display 1 by the rotation operation of the front housing 3 and the rear housing 4 (FIG. 9). Thus, the head-mounted display 1 can be additionally downsized.

Furthermore, the length from the end portion 17 of the left rack 5 to the end portion 19 of the right rack 6 is adjusted by the pinion gear 27. In other words, the user 2 can insert the left rack 5 and the right rack 6 into the front housing 3 (FIG. 10) from the state where the front housing 3 is folded (FIG. 9). Thus, the head-mounted display 1 can be additionally downsized.

Further, the user 2 can adjust an outer circumferential length of the head-mounted display 1 by the insertion and drawing out of the left rack 5 and/or the right rack 6 and the operation of the rear dial 39. Thus, the outer circumferential length can be adjusted as appropriate in accordance with the size of the head of the user 2, so it becomes difficult for a situation where the head-mounted display 1 becomes loose and comes off from the head or is tightened too much on the head to occur.

Furthermore, since the click mechanism is provided in the left rack 5, a sense of click can be imparted to the user 2 when the user 2 adjusts the left rack 5 and/or the right rack 6. Thus, the user 2 can easily perform the adjustment to an intended position. In addition, since a certain amount of force is necessary for moving the left rack 5 and the right rack 6, a situation where the left rack 5 and the right rack 6 are loosened due to a reactive force from the head when wearing the head-mounted display 1 will not occur.

Moreover, the left rack 5, the right rack 6, the left band 7, and the right band 8 are rotatably connected while using the left hinge 9 and the right hinge 10 as the rotation centers. Thus, the front housing 3 and the rear housing 4 are connected stably and thus can rotate stably.

Further, the end portion 17 of the left rack 5 and the end portion 21 of the left band 7 are rotatably connected by the left hinge 9. In addition, the end portion 19 of the right rack 6 and the end portion 23 of the right band 8 are rotatably connected by the right hinge 10. Thus, the left rack 5, the right rack 6, the left band 7, and the right band 8 are connected stably and thus can rotate stably.

Furthermore, the left rack 5 and the right rack 6 are coupled so as to be capable of moving relatively by the pinion gear 27. Thus, the length between the end portions can be adjusted accurately.

Moreover, by the pinion gear 27, the left rack 5 and the right rack 6 are connected such that the movement of the left rack 5 and the movement of the right rack 6 are synchronized. Thus, even when only the left rack 5 is moved, the right rack 6 moves along, so it becomes unnecessary to individually move the left rack 5 and the right rack 6. In other words, a burdensome task for the adjustment can be omitted, and thus the convenience is improved.

Further, the left rack 5 and the right rack 6 are connected by the pinion gear 27 such that the distance from the pinion gear 27 to the end portion 17 of the left rack 5 and the distance from the pinion gear 27 to the end portion 19 of the right rack 6 are synchronized. Thus, the user 2 can move the left rack 5 and the right rack 6 bilaterally symmetrically, and thus a situation where the position of the front housing 3, the rear housing 4, or the display unit 11 is deviated obliquely when the head-mounted display 1 is worn will not occur.

Furthermore, the stopper 42 restricts the detachment of the left rack 5 from the front housing 3. Thus, a situation where the connection of the left rack 5 and the right rack 6 with respect to the front housing 3 unintentionally comes off will not occur.

Moreover, the stopper 42 restricts the change of the distance so that the distance from the pinion gear 27 to the end portion 17 of the left rack 5 does not become larger than the predetermined length. Thus, it becomes possible to adopt as appropriate a configuration that matches with the specifications of the head-mounted display 1, such as a configuration in which the left rack 5 cannot be drawn out more than a certain amount.

Further, the display unit 11 and the substrate 35 are electrically connected by the flexible substrate 48 and the harness 49. Thus, it becomes possible to arrange the batteries 34 in the rear housing 4. In addition, power is stably supplied to the display unit 11, and thus the display unit 11 can operate stably.

Furthermore, the deformed flexible substrate 48 is accommodated in the sub-cover 54. Thus, it becomes difficult for a situation where the deformed flexible substrate 48 inhibits operations of other mechanisms to occur.

Further, in the present embodiment, the batteries 34 are arranged in the rear housing 4. In other words, since an external power supply becomes unnecessary, the head-mounted display 1 becomes portable, or the like, meaning that the convenience of the user 2 is improved. Moreover, it becomes possible to realize a balanced arrangement in which the display unit 11 having a relatively large weight is connected to the front housing 3 and the batteries 34 are arranged in the rear housing 4.

Figure 19:
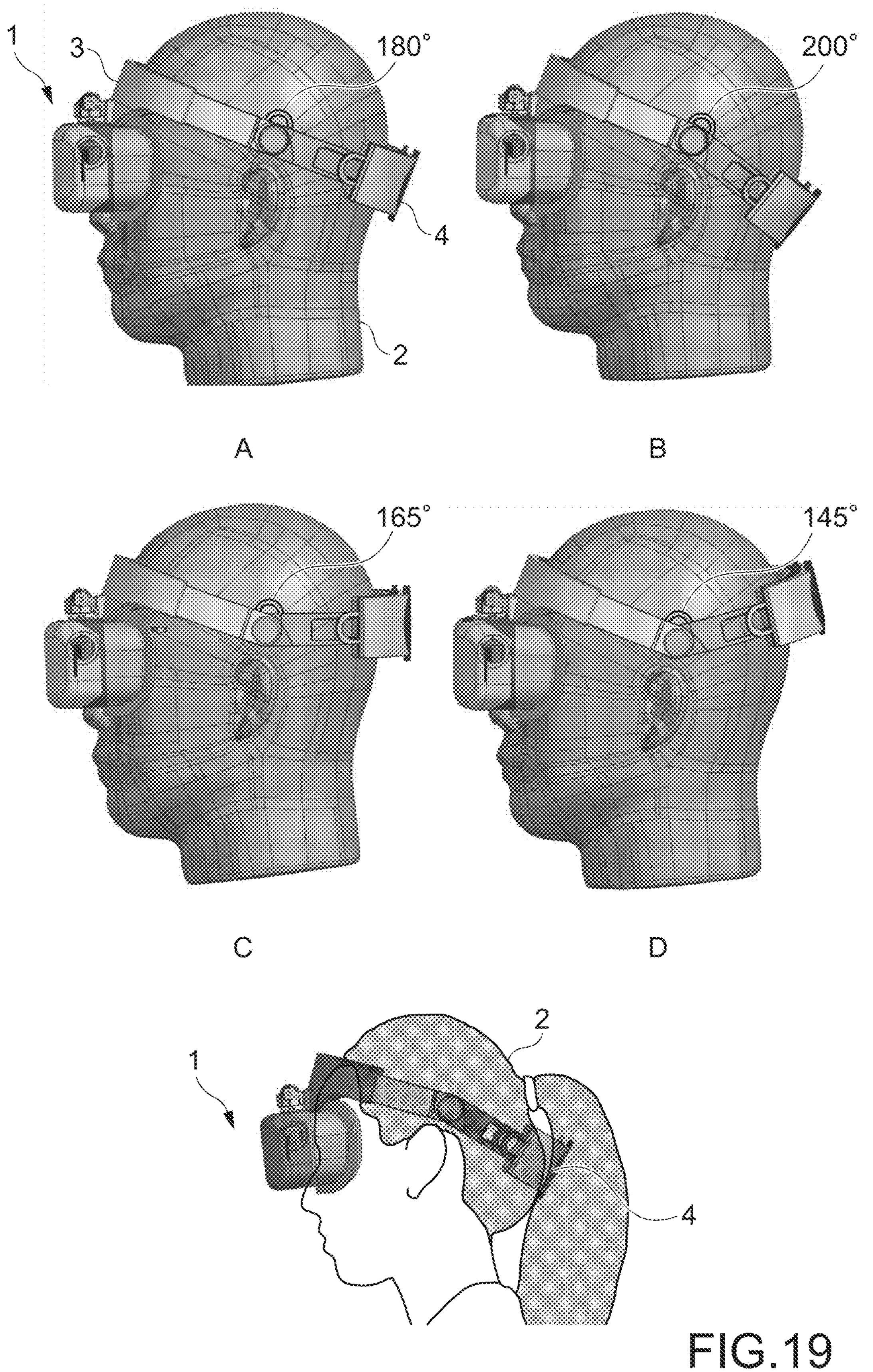
FIG. 19 Schematic diagrams each showing an example of a rotation angle of the front housing and the rear housing.

Furthermore, the relative rotation angle of the front housing 3 and the rear housing 4 is fixed at a predetermined angle by the left hinge 9 and the right hinge 10. FIG. 19 are schematic diagrams each showing an example of the rotation angle of the front housing 3 and the rear housing 4. FIGS. 19A to 19D show states where the rotation angles are 180 degrees, 200 degrees, 165 degrees, and 145 degrees, respectively. FIG. 19E shows a state where a woman is wearing the head-mounted display 1.

As shown in FIGS. 19A to 19D, the relative rotation angle of the front housing 3 and the rear housing 4 can be fixed at a plurality of predetermined angles. In other words, the position of the rear housing 4 can be fixed to a predetermined position. Thus, the user 2 can set the position of the rear housing 4 as appropriate so that it can be worn easily in accordance with the size or shape of the head.

Moreover, as shown in FIG. 19E, even when a woman with a pony tail wears the head-mounted display 1, the rear housing 4 can be adjusted to a position at which it does not interfere with the pony tail. Thus, a situation where the hairstyle is ruined when wearing the head-mounted display 1 will not occur.

Further, since the leaf spring 59 is positioned at a predetermined position with respect to the rear band plate 58, a sense of click is imparted to the user 2 when adjusting the rotation angle. Thus, it becomes possible for the user 2 to easily perform the adjustment to an intended rotation angle. In addition, since a certain amount of force is necessary for the rotation, it becomes difficult for a situation where the front housing 3 and the rear housing 4 rotate unintentionally to occur.

Second Embodiment

A more-detailed embodiment of the head-mounted display 1 according to the present technology will be described as a second embodiment. In descriptions hereinafter, descriptions on portions similar to those of the configurations and operations of the head-mounted display 1 described in the embodiment above will be omitted or simplified.

[Winding of Harness]

Figure 20:
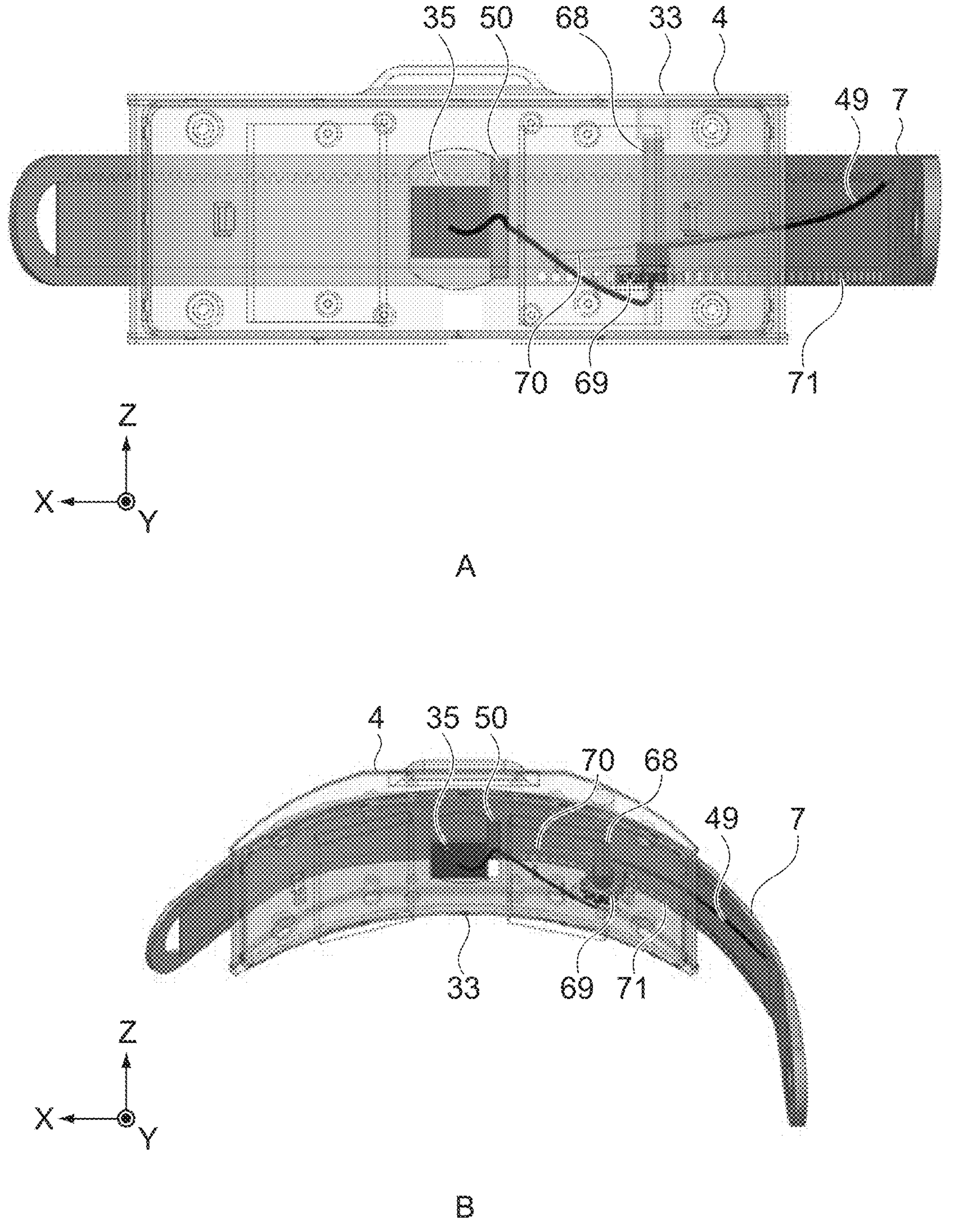
FIG. 20 Schematic diagrams each showing a wiring example of a harness.
Figure 21:
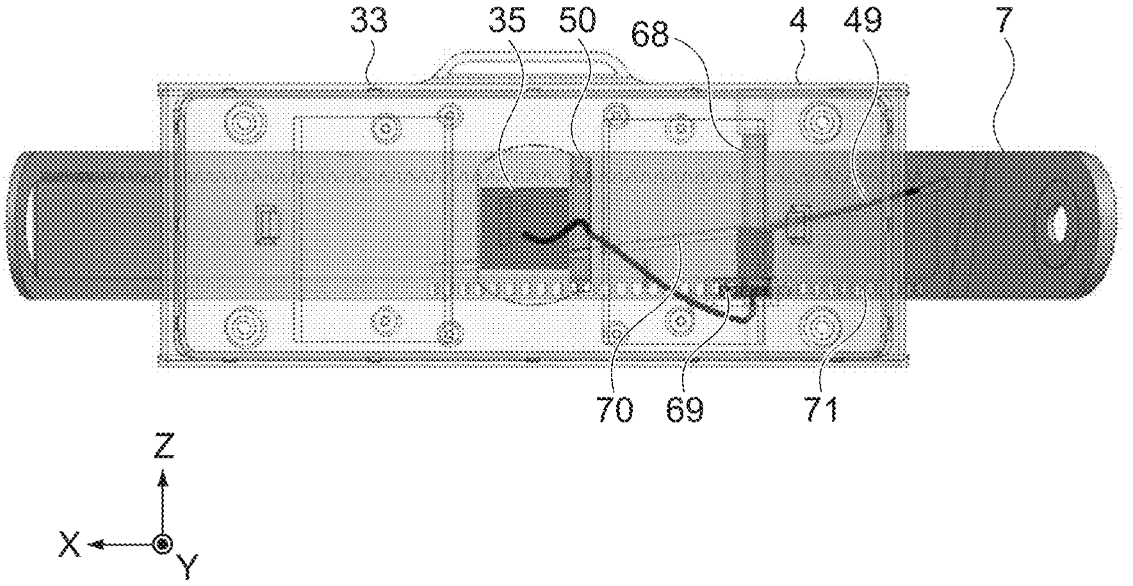
FIG. 21 Schematic diagrams each showing a wiring example of the harness.
Figure 21:
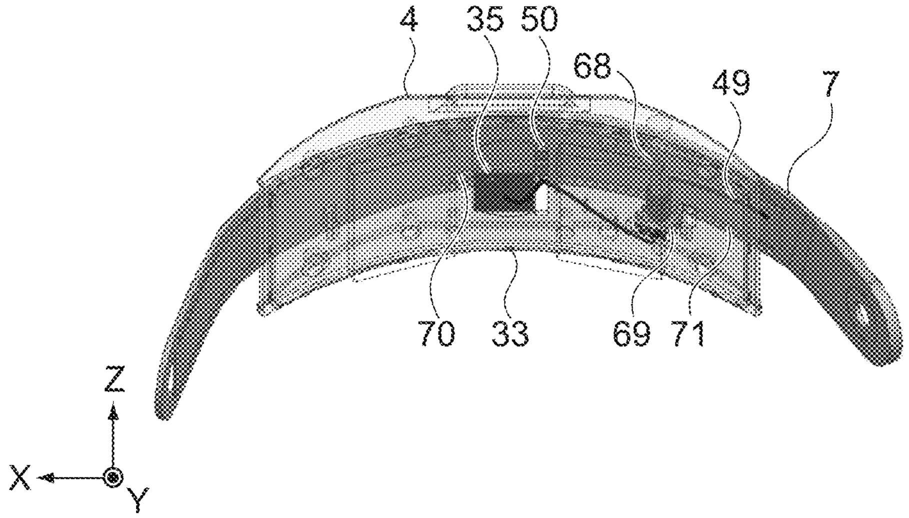
Figure 22:
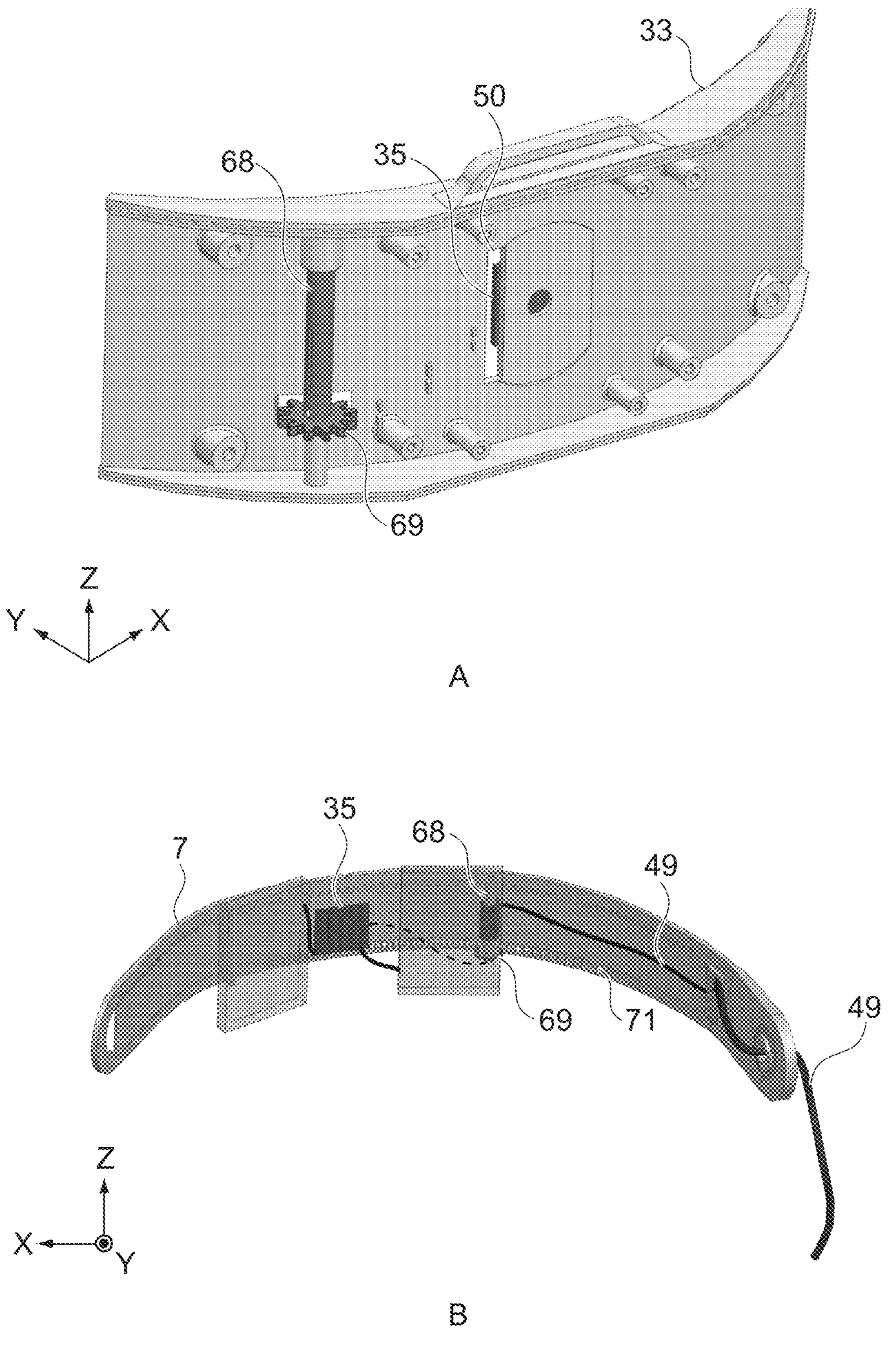
FIG. 22 Schematic diagrams each showing a wiring example of the harness.

FIGS. 20 to 22 are schematic diagrams each showing a wiring example of the harness 49. FIGS. 20 and 21 each show a state where the rear housing 4 and the left band 7 are seen from the front side. It is noted that in FIGS. 20 and 21, the rear housing 4 is illustrated transparently so that the harness 49 and the like positioned inside the rear housing 4 can be seen. FIG. 22A shows a state where the rear cover 33 is seen from the diagonally backward left side. FIG. 22B shows a state where the left band 7 is seen from the front side.

In the present embodiment, the display unit 11 and the substrate 35 are connected only by the harness 49. In other words, the flexible substrate 48 is not used for the connection. One end of the harness 49 is connected to the substrate 35 and is inserted into the inside of the rear housing 4 from the opening 50 formed in the rear cover 33.

In the present embodiment, by a harness roller drum 68, the harness 49 is wound in accordance with the adjustment of the length from the end portion 21 of the left band 7 to the end portion 23 of the right band 8 by the pinion gear 38. The harness roller drum 68 is a cylindrical member, and a gear-type flange portion 69 is formed at one end portion thereof. The harness roller drum 68 is arranged on the rear-side (the negative side of the Y axis) surface of the rear cover 33. Specifically, two upper and lower convex portions each including an opening are formed at positions more on the left side than the center of the rear-side surface of the rear cover 33 in the left-right direction. Both ends of the harness roller drum 68 are respectively inserted into the openings of the convex portions while the end portion thereof on a side where the flange portion 69 is formed is faced downwardly, to thus fix the harness roller drum 68 to the rear cover 33. The harness roller drum 68 is capable of rotating while using the up-down direction as a central axis.

The harness roller drum 68 is formed of a material such as metal, for example. A specific configuration of the harness roller drum 68 including the shape, the material, the arrangement method, and the like is not limited. The harness roller drum 68 corresponds to an embodiment of a winding member according to the present technology.

The harness 49 inserted into the inside of the rear housing 4 from the opening 50 is inserted into a lower end of the harness roller drum 68. An opening is formed at a side portion in the vicinity of the lower end of the harness roller drum 68, and the harness 49 passes through the opening to be exposed from the side portion of the harness roller drum 68. The exposed harness 49 is wound around the harness roller drum 68.

In the present embodiment, a groove portion 70 into which the harness 49 is press-fit is formed in the left band 7. The groove portion 70 is formed obliquely from the lower right to the upper left (lower left to upper right in FIG. 20) on the front-side surface of the left band 7. Of course, a specific shape of the groove portion 70 is not limited.

The harness 49 wound around the harness roller drum 68 is press-fit into the groove portion 70 of the left band 7. Then, the harness 49 is detached from the left band 7 at a terminal of the groove portion 70 (the upper right terminal in FIG. 20A), passes through the opening of the left hinge 9, is wired so as to be provided along the front-side surface of the left rack 5, and is connected to the display unit 11.

Further, an engagement portion 71 is formed at a lower edge of the left band 7. The engagement portion 71 includes teeth that face the front side, and the teeth of the engagement portion 71 engage with the teeth of the flange portion 69 of the harness roller drum 68.

FIG. 21 each show a state where the left band 7 has moved toward the right side (the left side in FIGS. 20 and 21) from the state shown in FIG. 20. When the left band 7 moves toward the left side in FIGS. 20 and 21, the harness roller drum 68 rotates clockwise when seen from the lower side since the flange portion 69 of the harness roller drum 68 and the engagement portion 71 are engaged with each other. As a result, the harness 49 that has been press-fit into the groove portion 70 is detached from the groove portion 70 and is wound by the harness roller drum 68. The winding amount in FIG. 21 is larger than the winding amount in FIG. 20.

Figure 23:
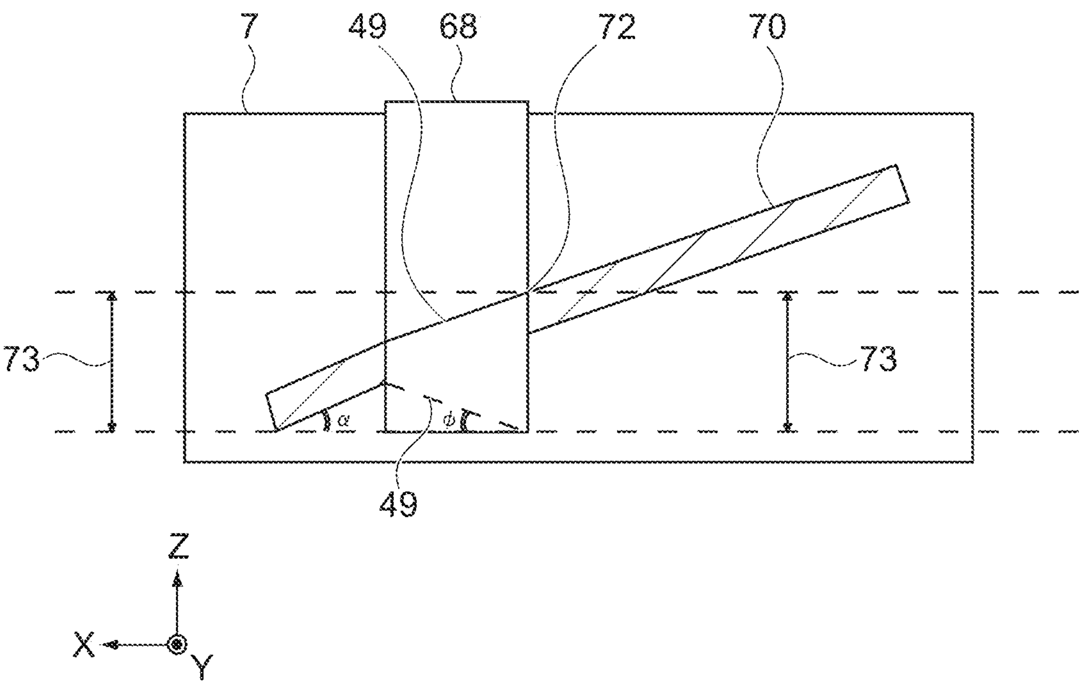
FIG. 23 A schematic diagram showing an example of a winding angle of the harness.

FIG. 23 is a schematic diagram showing an example of a winding angle of the harness 49. FIG. 23 shows an angle (α) of the groove portion 70 with respect to the left-right direction (X-axis direction). A winding angle (φ) of the harness 49 wound around the harness roller drum 68 is also shown.

In the present embodiment, the groove portion 70 and the harness roller drum 68 are designed such that the angle α of the groove portion 70 and the winding angle φ of the harness 49 match. For example, the angles α and φ can be matched by a method of adjusting a tilt of the groove portion 70 when forming the groove portion 70, a method of adjusting a diameter of the harness roller drum 68, and the like. Of course, a specific method for causing the angles α and φ to match is not limited.

When the angles α and φ differ, a deviation is caused in a winding position 72 at which the harness 49 is wound. For example, when the angle φ is smaller than the angle α, the winding position 72 in the harness roller drum 68 gradually deviates toward the lower side with respect to the winding position 72 in the groove portion 70, as the harness 49 is wound. Further, when the angle φ is larger than the angle α, the winding position 72 in the harness roller drum 68 deviates toward the upper side with respect to the winding position 72 in the groove portion 70. In other words, in these cases, the harness 49 will not be wound smoothly, and thus a trouble is caused in the winding of the harness 49 or the operation of the left band 7.

Since the configuration in which the angles α and φ match is adopted in the present embodiment, such a trouble does not occur. In other words, it can also be said that the pitch of the harness roller drum 68 and the pitch of the groove portion 70 match. Alternatively, it can also be said that a vertical movement amount 73 (indicated by arrows) of the groove portion 70 and the vertical movement amount 73 of the harness 49 wound around the harness roller drum 68 match. It is noted that the angles α and φ may also be referred to as pitch angles.

It is noted that a torsion spring may be arranged in the harness roller drum 68. Thus, a tension is generated in the harness 49, and operations of the harness roller drum 68 and the left band 7 are stabilized. Besides these, the method of winding the harness 49 is not limited to the method that uses the harness roller drum 68, and the harness 49 may be wound by other methods.

[Press Fitting of Harness]

Figure 24:
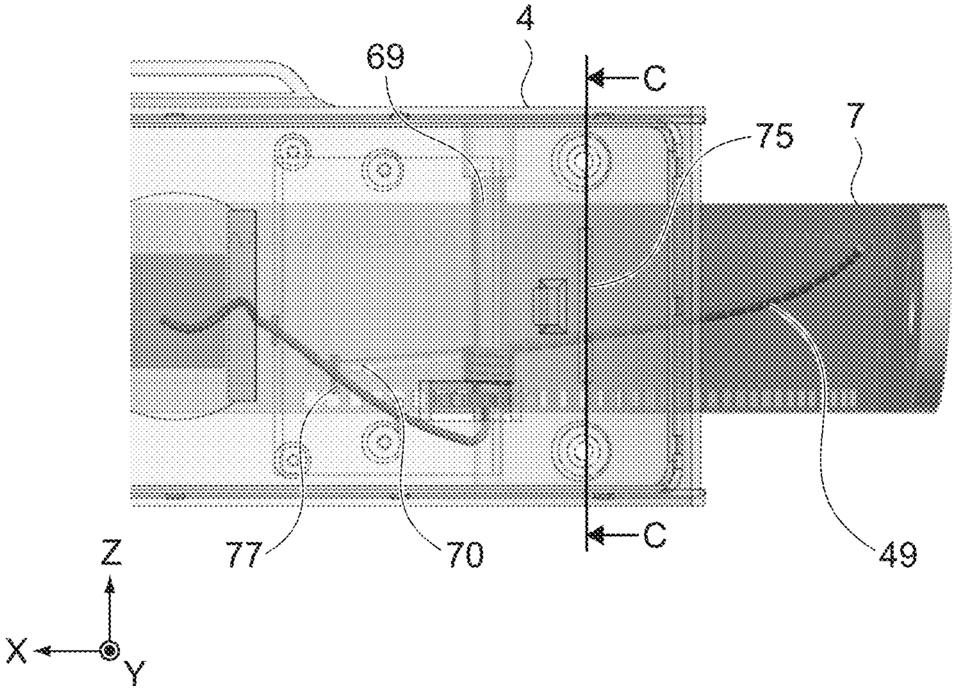
FIG. 24 Schematic diagrams each showing a configuration example of a harness pusher flange.
Figure 24:
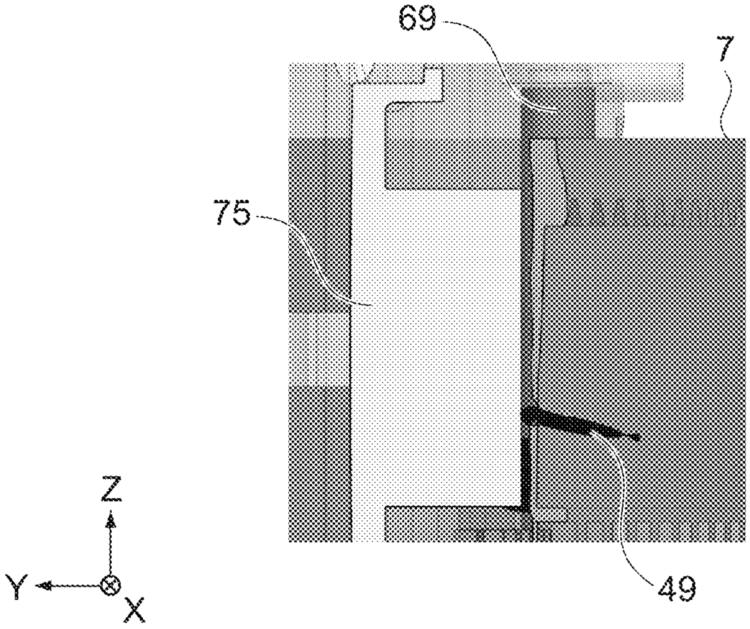
Figure 25:
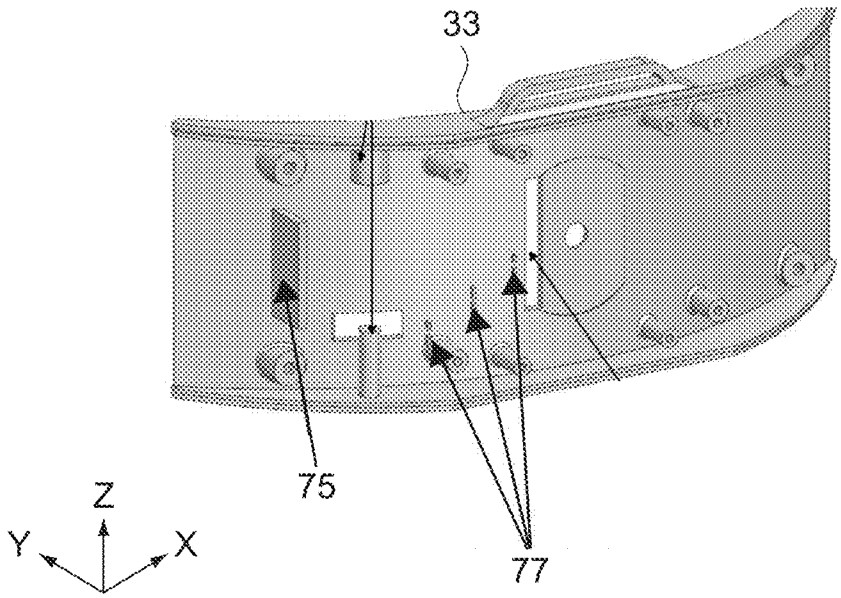
FIG. 25 Schematic diagrams each showing the configuration example of the harness pusher flange.
Figure 25:
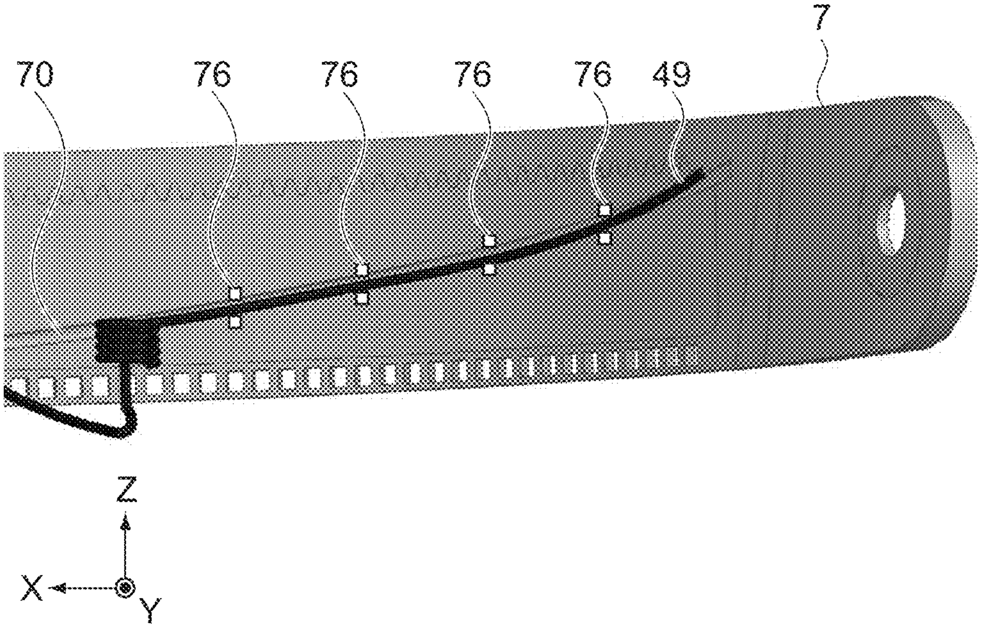

FIGS. 24 and 25 are schematic diagrams each showing a configuration example of a harness pusher flange. FIG. 24A shows a state where the rear housing 4 is seen from the front side. FIG. 24B is a cross-sectional view taken along the line C-C of FIG. 24A. FIG. 25A shows a state where the rear cover 33 is seen from the diagonally backward left side. FIG. 25 shows a state where the left band 7 is seen from the front side.

In the present embodiment, by a harness pusher flange 75, the harness 49 is press-fit into the groove portion 70 in accordance with the adjustment of the length from the end portion 21 of the left band 7 to the end portion 23 of the right band 8 by the pinion gear 38.

The harness pusher flange 75 is a member having a rectangular plate shape and is arranged on the rear-side surface of the rear cover 33 so as to be parallel to the YZ plane. The harness pusher flange 75 may be connected to the rear cover 33 as a member different from the rear cover 33, or may be formed integrally with the rear cover 33. Besides these, a specific configuration of the harness pusher flange 75 including the material, the shape, the arrangement, and the like is not limited. The harness pusher flange 75 corresponds to an embodiment of a press fit member according to the present technology.

Press fit points 76 are formed at predetermined intervals in the groove portion 70 of the left band 7. In FIG. 25B, positions of the press fit points 76 are schematically indicated by small squares. A width of the groove portion 70 becomes small at the press fit points 76 out of the groove portion 70 so that the harness 49 is fixed tightly. On the other hand, at portions other than the press fit points 76 in the groove portion 70, the harness 49 is fit loosely.

When the left band 7 moves toward the left side (the right side in FIG. 24A), the harness 49 wound around the harness roller drum 68 is detached from the harness roller drum 68 and is temporarily in a state where it is not press-fit into the groove portion 70. After that, the harness 49 comes into contact with the harness pusher flange 75 to be pushed toward the rear side (the negative side of the Y axis) and press-fit at the press fit points 76. In other words, in FIG. 24A, the harness 49 is not press-fit into the groove portion 70 at a portion between the harness roller drum 68 and the harness pusher flange 75 (slightly floats with respect to the left band 7), and is press-fit on the right side.

Figure 26:
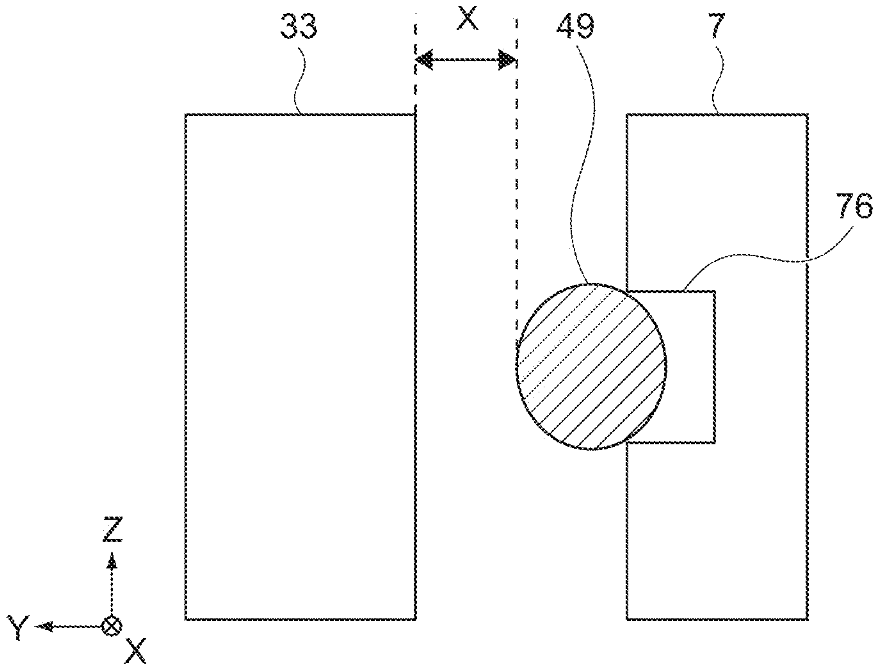
FIG. 26 Schematic diagrams showing an example of design of the harness pusher flange and a press fit point.
Figure 26:
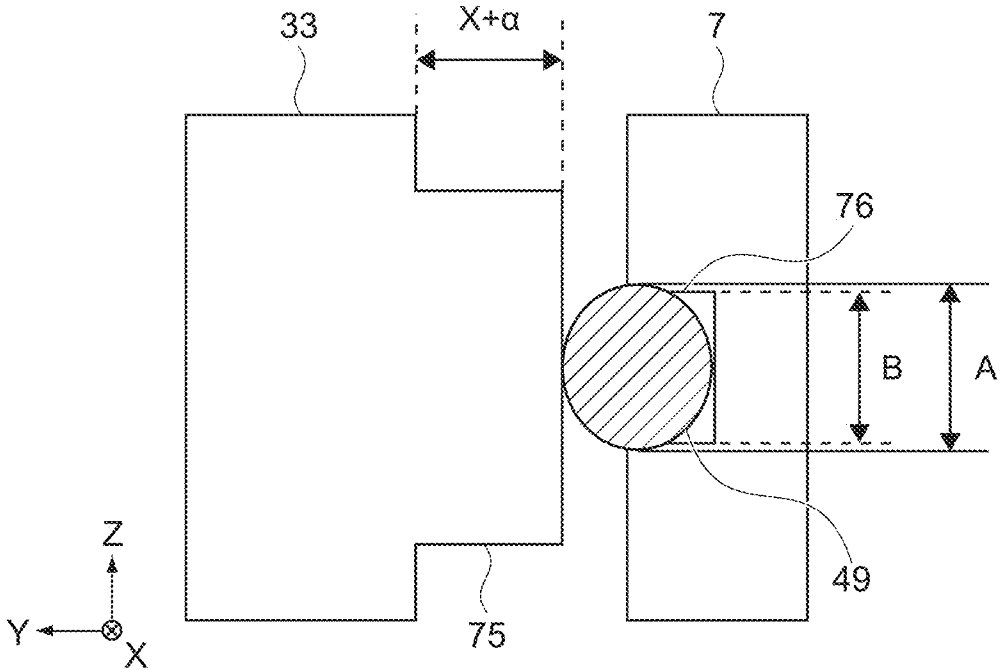

FIG. 26 are schematic diagrams showing an example of design of the harness pusher flange 75 and the press fit point 76. FIG. 26 each show a diagram in which the rear cover 33, the harness 49, and the press fit point 76 are seen from the left side. FIG. 26A shows a diagram of a portion where the harness pusher flange 75 is not present. FIG. 26B shows a diagram of a portion where the harness pusher flange 75 is present.

In FIG. 26A, a distance X between the rear cover 33 and the harness 49 at the portion where the harness pusher flange 75 is not present is indicated by an arrow. FIG. 26B shows a length X+α of the harness pusher flange 75. In other words, in FIG. 26B, the harness 49 is press-fit more toward the right side by the distance α than in FIG. 26A. Values of the distance X and α are set as appropriate so that the harness 49 is press-fit sufficiently.

Further, FIG. 26B shows a diameter A of the harness 49 and a diameter B of the groove portion 70 at the press fit point 76. The diameter B of the groove portion 70 is designed to be slightly smaller than the diameter A of the harness 49. In other words, the diameter of the harness 49 at normal times is A, and the diameter becomes B in a state where the harness 49 is deformed to contract longitudinally during press fitting and is press-fit.

Thus, since resilience with which the harness 49 tries to return from the deformation continues to act on the press fit points 76 during press fitting, friction is caused between the harness 49 and the press fit points 76, and it becomes difficult for the harness 49 to come off. In other words, the harness 49 is press-fit tightly. Values of the diameters A and B are set as appropriate so as to enable the harness 49 to be press-fit sufficiently while taking into account the diameter and material of the harness 49, the material of the left band 7, and the like.

By providing the mechanism for winding and press-fitting the harness 49 as described above, it becomes possible to prevent a situation where the harness 49 bows to inhibit operations of other mechanisms from occurring.

It is noted that as shown in FIG. 25A, fixing portions 77 for fixing a fixed-length portion of the harness 49 (a portion that is not wound nor press-fit) may be formed on the rear-side surface of the rear cover 33. Thus, it becomes possible to prevent a situation where the fixed-length portion bows to inhibit operations of other mechanisms from occurring. Besides these, specific methods for winding and press-fitting the harness 49 are not limited.

Other Embodiments

The present technology is not limited to the embodiments described above, and various other embodiments can be realized.

[Spring Property of Rack]

Figure 29:
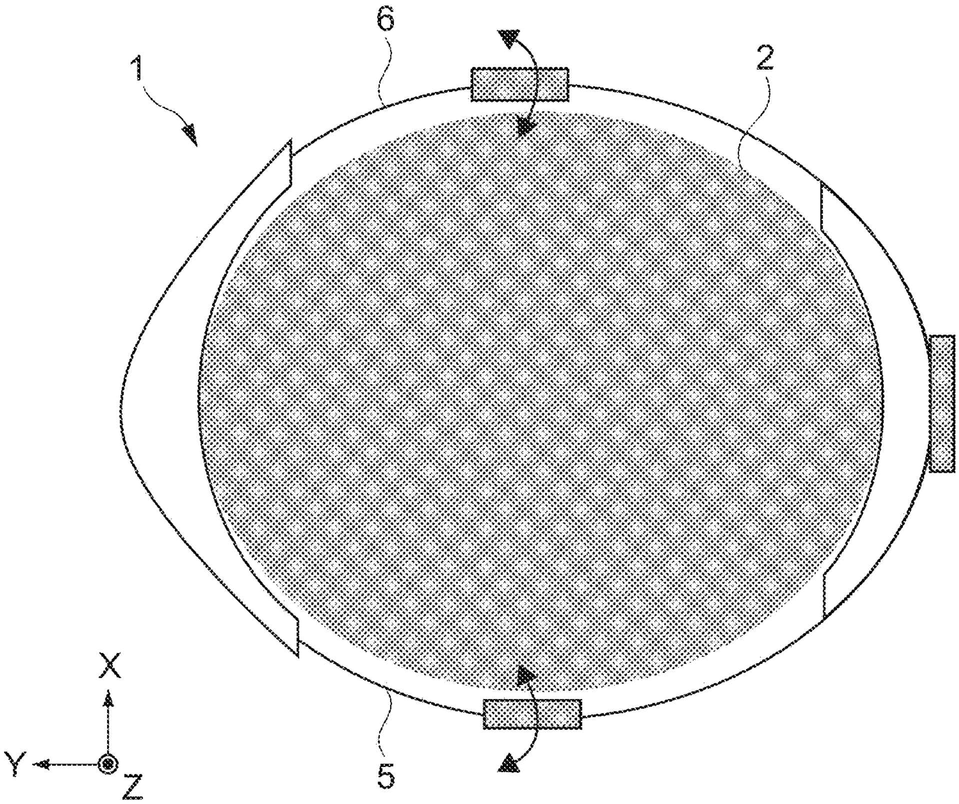
FIG. 29 A schematic diagram showing a configuration example of the left rack and the right rack.

FIG. 29 is a schematic diagram showing a configuration example of the left rack 5 and the right rack 6. FIG. 29 shows a state where the head-mounted display 1 is seen from the upper side. In the present example, the left rack 5 and the right rack 6 are each formed by a metal plate having a spring property. Specifically, when the head-mounted display 1 is worn, the head of the user 2 is slightly tightened so that a solid sense of fit can be obtained during use. Moreover, the left band 7 and the right band 8 may similarly have a spring property.

[Usage While Being Held in Hand]

Figure 30:
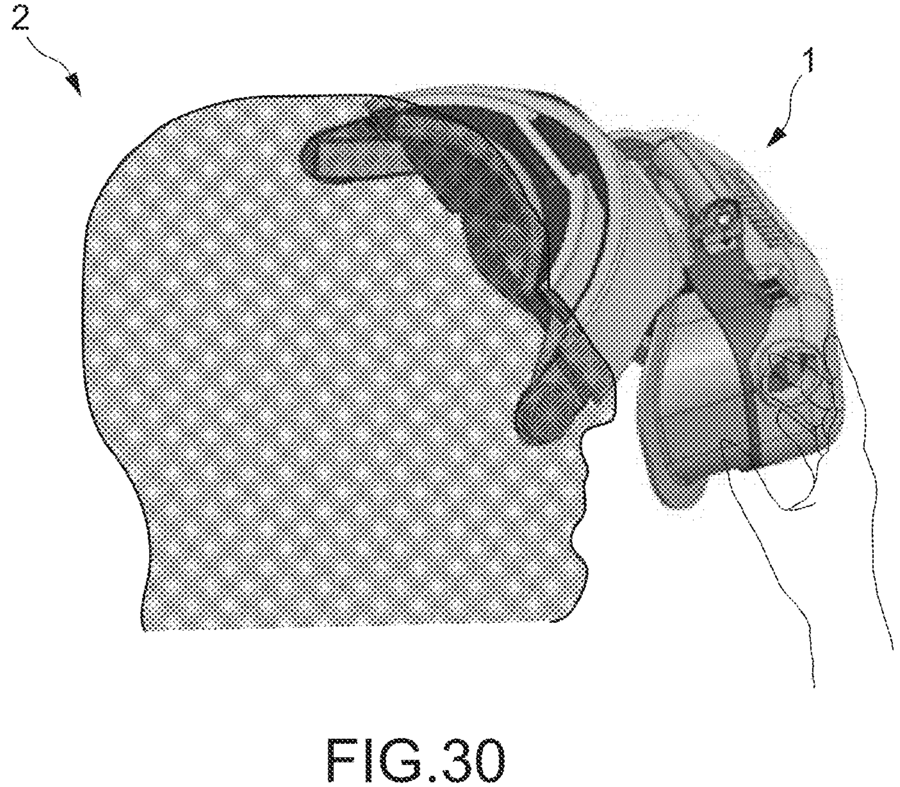
FIG. 30 A schematic diagram showing a state where the head-mounted display is used while being held in a hand.

FIG. 30 is a schematic diagram showing a state where the head-mounted display 1 is used while being held in a hand. In this manner, the user 2 is also capable of bringing the head-mounted display 1 in the folded state to the eyes, to view videos while holding it in the hand. Thus, the convenience of the user 2 is improved when wishing to view a video right away, when viewing for only a short time, and the like, for example.

In this case, a configuration in which the accommodation position of the rear housing 4 is set at a position that does not inhibit an area where the user 2 watches the display unit 11 is adopted. In the present embodiment, when the rear housing 4 is accommodated, the rear housing 4 is positioned on the inner side of the front housing 3. In other words, the rear housing 4 is not positioned between both eyes of the user 2 and the display unit 11, and the rear housing 4 does not inhibit the field of view of the user 2.

[Automatic Power Supply Control]

Figure 27:
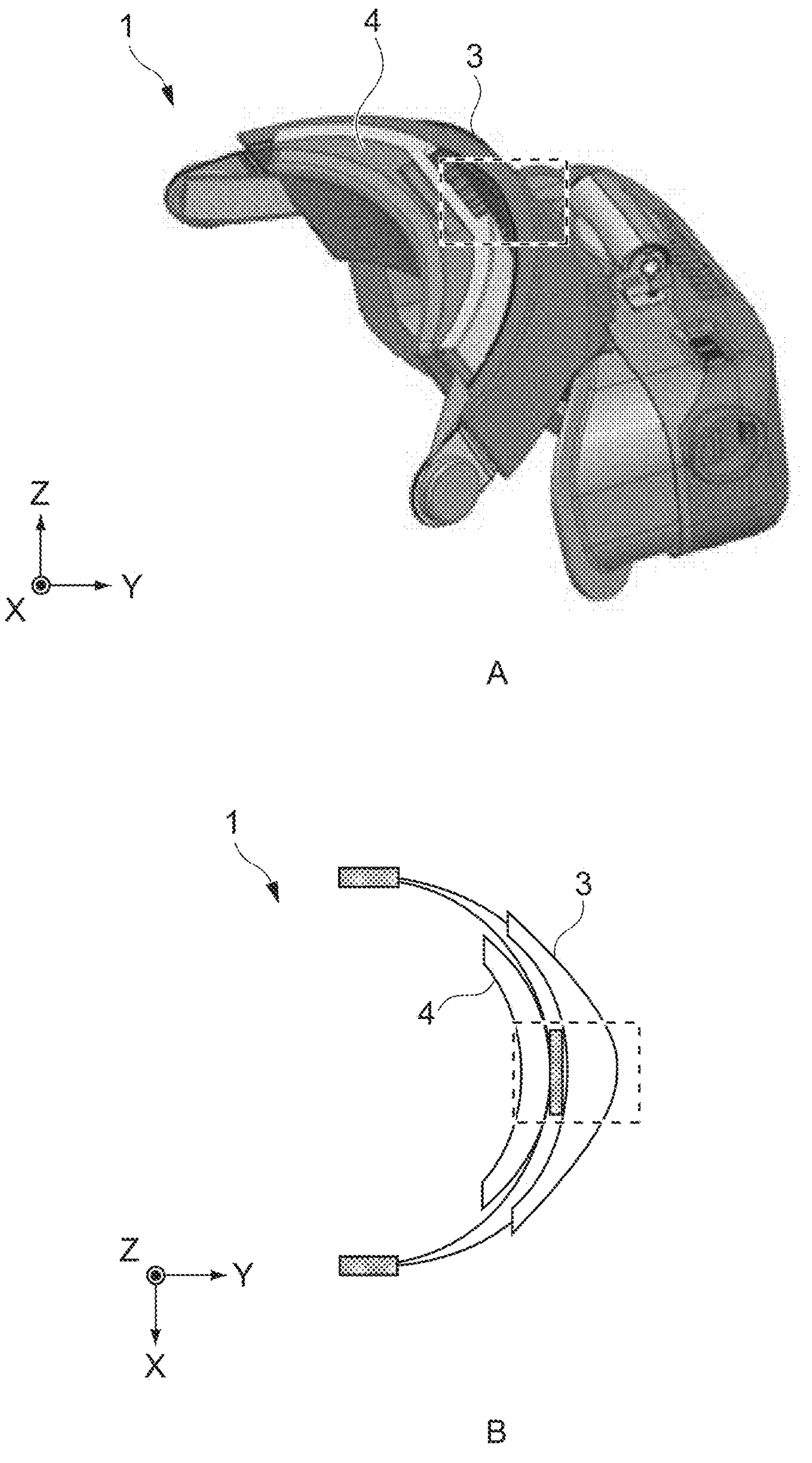
FIG. 27 Schematic diagrams each showing a configuration example of a power supply control unit.
Figure 28:
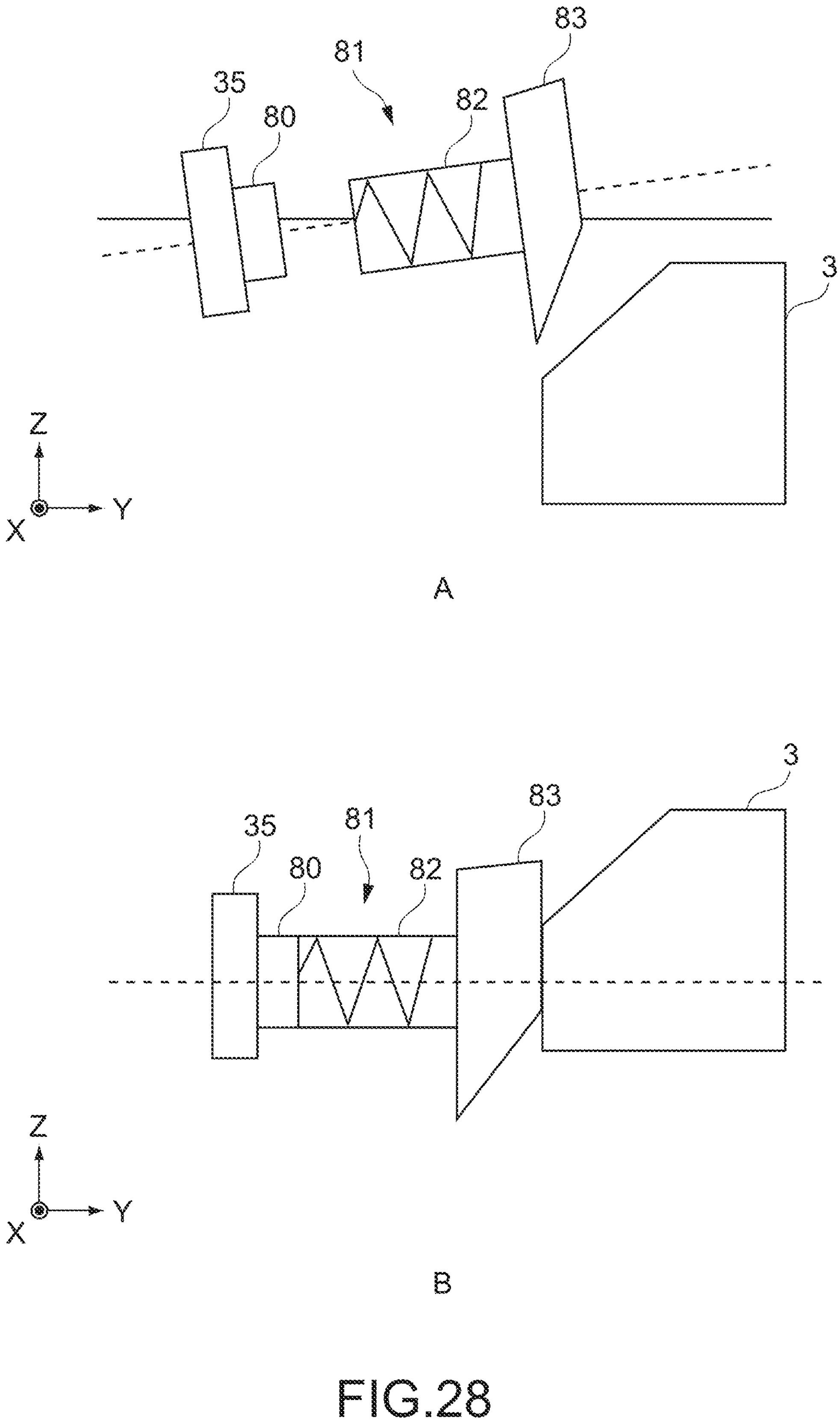
FIG. 28 Schematic diagrams each showing a configuration example of the power supply control unit.

FIGS. 27 and 28 are schematic diagrams each showing a configuration example of a power supply control unit. FIG. 27A shows a state where the head-mounted display 1 in the folded state is seen from the right side. FIG. 27B schematically shows a state where the head-mounted display 1 in the folded state is seen from above. The power supply control unit is provided at square portions in broken lines shown in FIG. 27, that is, at a center of the front housing 3 or the rear housing 4 in the left-right direction (X direction).

FIG. 28 schematically show a state where the power supply control unit provided at the square portions in FIG. 27 is seen from the right side. In the present embodiment, when the head-mounted display 1 is in the folded state, the power supply control unit turns off the power supply of the head-mounted display 1.

The power supply control unit includes a power supply button 80 and a power supply lever 81. The power supply button 80 is arranged on the substrate 35 of the rear housing 4. The power supply lever 81 includes a base portion 82 and an abutment portion 83. The base portion 82 is a circular cylindrical member. The abutment portion 83 is, for example, a plate-like member, and is connected to one end portion of the base portion 82.

FIG. 28A shows a state right before the head-mounted display 1 is completely folded. In other words, a state where the rear housing 4 is positioned slightly above the front housing 3 is shown. FIG. 28B shows a state where the head-mounted display 1 is completely folded.

In FIG. 28A, an end portion of the base portion 82 on a side where the abutment portion 83 is not connected (the left end portion in FIG. 28A) is positioned apart from the power supply button 80. When the head-mounted display 1 is completely folded from this state to be set to the state shown in FIG. 28B, the abutment portion 83 comes into contact with the front housing 3 to be squeezed on the left side in FIG. 28B, and thus the power supply button 80 is pushed in by the left end portion of the base portion 82.

When the power supply button 80 is pushed in, the power supply of the head-mounted display 1 is turned off. With such a configuration, the power supply control unit which automatically turns off the power supply when folded can be realized. Thus, a burdensome task of the user 2 to turn off the power supply can be omitted, and thus the convenience is improved.

It is noted that in the present embodiment, the portion of the abutment portion 83 and the portion of the front housing 3 that come into contact first are notched obliquely, so no catch occurs, and folding can be performed smoothly. Moreover, a spring is wound around the base portion 82, and the base portion 82 and the abutment portion 83 operate by the spring extending and contracting in accordance with the contact between the abutment portion 83 and the front housing 3.

Alternatively, a sensor which detects a rotation angle may be provided so that the power supply is turned off when the rotation angle becomes 0 degree (i.e., folded state). Alternatively, the power supply may be turned off when a predetermined time (e.g., three seconds) has elapsed since the folding. Conversely, the power supply may be automatically turned on when the head-mounted display 1 is unfolded. Besides these, control of the power supply may be performed by an arbitrary method such as a method that uses a magnetic sensor.

It is noted that when the usage while held in a hand as shown in FIG. 30 is assumed, a configuration in which the automatic power supply control is not performed may be adopted. In other words, it is also possible to allow, when the head-mounted display 1 is folded so as to be used while being held in a hand, viewing of a video to be continued without turning off the power supply. Conversely, when the automatic power supply control is performed, it is also possible to adopt a configuration that does not assume the usage while being held in a hand. In other words, an arbitrary configuration may be selected as appropriate according to an assumed usage pattern.

[Lock Mechanism]

A mechanism for fixing the rear housing 4 so that it does not move in the folded state may be provided. Specifically, the front housing 3 includes a first protrusion portion and the rear housing 4 includes a second protrusion portion, and in the state where the rear housing 4 is accommodated, the first protrusion portion and the second protrusion portion come into contact with each other. In addition, at least one of the first protrusion portion or the second protrusion portion includes a spring mechanism, and in the state where the rear housing 4 is accommodated, the rear housing 4 is fixed by the pressing by the spring mechanism.

Herein, the left half of the front housing 3 (the protrusion portion including the obliquely-notched portion) shown in FIG. 28 corresponds to the first protrusion portion. In addition, the base portion 82 and the abutment portion 83 correspond to the second protrusion portion. Further, the spring wound around the base portion 82 corresponds to the spring mechanism.

In the present embodiment, in the folded state (FIG. 28B), the protrusion portion of the front housing 3 and the abutment portion 83 are in contact with each other. Further, the abutment portion 83 is pressed toward the front housing 3 by the spring wound around the base portion 82. Thus, a frictional force is generated between the abutment portion 83 and the front housing 3, and thus it becomes difficult for the abutment portion 83 to move up and down with respect to the front housing 3.

In other words, it becomes possible to prevent a situation where the rear housing 4 rotates beyond the folded state from occurring, and improve the convenience of the user 2. It is noted that the spring mechanism may be formed in only the protrusion portion of the front housing 3 without being formed in the base portion 82. Alternatively, the spring mechanism may be formed in both of the base portion 82 and the protrusion portion of the front housing 3.

[Limitation Mechanism]

The rotation angle of the front housing 3 and the rear housing 4 may be limited. Specifically, the hinge includes a limitation mechanism which limits the rotation of the front housing 3 and the rear housing 4 so that the relative rotation angle of the front housing 3 and the rear housing 4 about the hinge does not become equal to or larger than a predetermined angle.

For example, the hinge such as the left hinge 9 is provided with a stopper mechanism for limiting the rotation angle of the rear housing 4. Specifically, a protrusion shape is provided in a part of the rear band plate 58 shown in FIG. 18, and the rotation is limited so that the leaf spring 59 does not rotate a predetermined angle or more. Thus, it becomes possible to limit the rotation of the rear housing 4 so that the rear housing 4 does not rotate a predetermined angle or more (e.g., 200 degrees shown in FIG. 19B, or the like).

If the rotation angle becomes too large (i.e., the rear housing 4 rotates too much in the downward direction in FIG. 19), a case where the cable bows in a periphery of the hinge and a load is applied to the cable may occur. By providing the limitation mechanism, it becomes possible to prevent a load from being applied to the cable. It is noted that a specific method for limiting the rotation angle is not limited, and an arbitrary method may be used.

The respective configurations of the head-mounted display, the front housing, the rear housing, the left rack, the right rack, the left band, the right band, the left hinge, the right hinge, and the like that have been described with reference to the respective figures are mere embodiments and can be arbitrarily modified without departing form the gist of the present technology. In other words, other arbitrary configurations for executing the present technology may also be adopted.

In the present disclosure, the term “substantially” is merely used to help understand the descriptions, and there is no special meaning when using or not using the term “substantially”. In other words, in the present disclosure, a concept defining a shape, a size, a positional relationship, a state, and the like such as “center”, “middle”, “identical”, “equal”, “same”, “parallel”, “symmetric”, “rectangular shape”, “circular shape”, “ring shape”, “circular cylinder shape”, “cylindrical shape”, “plate shape”, “arc shape”, “band shape”, “strap shape”, and “R shape” is a concept including “substantially at the center”, “substantially in the middle”, “substantially identical”, “substantially equal”, “substantially the same”, “substantially parallel”, “substantially symmetric”, “substantially a rectangular shape”, “substantially a circular shape”, “substantially a ring shape”, “substantially a circular cylinder shape”, “substantially a cylindrical shape”, “substantially a plate shape”, “substantially an arc shape”, “substantially a band shape”, “substantially a strap shape”, “substantially an R shape”, and the like. For example, a state within a predetermined range (e.g., range within ±10%) that uses “completely at the center”, “completely in the middle”, “completely identical”, “completely equal”, “completely the same”, “completely parallel”, “completely symmetric”, “completely a rectangular shape”, “completely a circular shape”, “completely a ring shape”, “completely a circular cylinder shape”, “completely a cylindrical shape”, “completely a plate shape”, “completely an arc shape”, “completely a band shape”, “completely a strap shape”, “completely an R shape”, and the like as a reference is also included. Accordingly, even when the term “substantially” is not added, what you might call a concept that may be expressed by adding “substantially” may be included. Conversely, a complete state is not necessarily excluded regarding the state expressed by adding “substantially”.

In the present disclosure, expressions that use “than” as in “larger than A” and “smaller than A” are expressions that comprehensively include both of a concept including a case of being equal to A and a concept not including the case of being equal to A. For example, “larger than A” is not limited to a case that does not include equal to A and also includes “A or more”. In addition, “smaller than A” is not limited to “less than A” and also includes “A or less”. In executing the present technology, specific settings and the like only need to be adopted as appropriate from the concepts included in “larger than A” and “smaller than A” so that the effects described above are exerted.

Of the feature portions according to the present technology described above, at least two of the feature portions can be combined. In other words, the various feature portions described in the respective embodiments may be arbitrarily combined without distinction of the embodiments. Moreover, the various effects described above are mere examples and are not limited, and other effects may also be exerted.

It is noted that the present technology can also take the following configurations.

(1)

A head-mounted display, including:

a first housing portion in which a display unit which displays an image is arranged;

a second housing portion in which a substrate is arranged;

a band which includes a hinge and connects the first housing portion and the second housing portion such that the first housing portion and the second housing portion become rotatable while using the hinge as a rotation center; and an electrical connection portion arranged in the band, in which the display unit and the substrate are electrically connected via the electrical connection portion.

(2) The head-mounted display according to (1), in which the head-mounted display is capable of accommodating the second housing portion on an inner side of the first housing portion by the rotation of the first housing portion and the second housing portion that uses the hinge as the rotation center.

(3) The head-mounted display according to (2), in which an accommodation position of the second housing portion is a position that does not inhibit an area where a user watches the display unit.

(4) The head-mounted display according to any one of (1) to (3), in which the band includes a first connection member which is connected to the first housing portion and a second connection member which is connected to the second housing portion, and the first connection member and the second connection member are connected to become rotatable while using the hinge as the rotation center.

(5) The head-mounted display according to (4), in which the first connection member includes a first end portion and a second end portion on an opposite side of the first end portion, the second connection member includes a third end portion and a fourth end portion on an opposite side of the third end portion, and the hinge includes a first hinge portion which rotatably connects the first end portion and the third end portion and a second hinge portion which rotatably connects the second end portion and the fourth end portion.

(6) The head-mounted display according to (5), in which the first connection member includes a first adjustment mechanism capable of adjusting a length from the first end portion to the second end portion.

(7) The head-mounted display according to (6), in which the first connection member includes a first division member including the first end portion and a second division member including the second end portion, and the first adjustment mechanism includes a coupling member which connects the first division member and the second division member such that the first division member and the second division member are capable of moving relatively.

(8) The head-mounted display according to (7), in which the coupling member connects the first division member and the second division member such that a movement of the first division member and a movement of the second division member are synchronized.

(9) The head-mounted display according to (8), in which the first connection member includes a reference point which becomes a reference for a distance of the first end portion of the first division member and a distance of the second end portion of the second division member, and the coupling member connects the first division member and the second division member such that a distance from the reference point to the first end portion and a distance from the reference point to the second end portion are synchronized.

(10) The head-mounted display according to any one of (4) to (9), in which the first connection member includes a restriction portion which restricts detachment of the first connection member from the first housing portion.

(11) The head-mounted display according to (10), in which the first connection member includes a first end portion and a reference point which becomes a reference for a distance of the first end portion, and the restriction portion restricts a change of a distance from the reference point to the first end portion so that the distance from the reference point to the first end portion does not become larger than a predetermined length.

(12) The head-mounted display according to any one of (5) to (9), in which the second connection member includes a second adjustment mechanism capable of adjusting a length from the third end portion to the fourth end portion.

(13) The head-mounted display according to (12), in which the electrical connection portion includes a flexible substrate which electrically connects the display unit and the substrate, the flexible substrate is deformed along with the adjustment of the length from the third end portion to the fourth end portion of the second connection member by the second adjustment mechanism, and the second housing portion includes an accommodation member which accommodates the deformed flexible substrate.

(14) The head-mounted display according to (12) or (13), in which the electrical connection portion includes a cable which electrically connects the display unit and the substrate, and the second housing portion includes a winding member which winds the cable in accordance with the adjustment of the length from the third end portion to the fourth end portion of the second connection member by the second adjustment mechanism.

(15) The head-mounted display according to any one of (12) to (14), in which the electrical connection portion includes a cable which electrically connects the display unit and the substrate, the second connection member includes a groove portion into which the cable is press-fit, and the second housing portion includes a press fit member which press-fits the cable into the groove portion in accordance with the adjustment of the length from the third end portion to the fourth end portion of the second connection member by the second adjustment mechanism.

(16) The head-mounted display according to any one of (1) to (15), in which the hinge includes a fixing mechanism which fixes a relative rotation angle of the first housing portion and the second housing portion about the hinge at a predetermined angle.

(17) The head-mounted display according to any one of (1) to (16), in which a battery is arranged in the second housing portion.

(18) The head-mounted display according to (2) or (3), in which the first housing portion includes a first protrusion portion, the second housing portion includes a second protrusion portion, and the first protrusion portion and the second protrusion portion come into contact with each other in a state where the second housing portion is accommodated.

(19) The head-mounted display according to (18), in which at least one of the first protrusion portion or the second protrusion portion includes a spring mechanism, and the second housing portion is fixed by pressing by the spring mechanism in the state where the second housing portion is accommodated.

(20) The head-mounted display according to any one of (1) to (19), in which the hinge includes a limitation mechanism which limits the rotation of the first housing portion and the second housing portion so that a relative rotation angle of the first housing portion and the second housing portion about the hinge does not become equal to or larger than a predetermined angle.

REFERENCE SIGNS LIST

1 head-mounted display
3 front housing
4 rear housing
5 left rack
6 right rack
7 left band
8 right band
9 left hinge
10 right hinge
11 display unit
17 end portion
19 end portion
21 end portion
23 end portion
27 pinion gear
34 battery
35 substrate
38 pinion gear
39 rear dial
42 stopper
48 flexible substrate
49 harness
54 sub-cover
58 rear band plate
59 leaf spring
60 axial pin
68 harness roller drum
75 harness pusher flange
80 power supply button
81 power supply lever

The invention claimed is:

1. A head-mounted display, comprising:

a first housing portion that includes a display unit configured to display an image;

a second housing portion that includes a substrate; and a band different from each of the first housing portion and the second housing portion, wherein a length of the band is adjustable, the band includes:

a first hinge;

a second hinge; and an electrical connection portion, the band is configured to connect the first housing portion and the second housing portion based on the first hinge and the second hinge, the first housing portion and the second housing portion are rotatable with respect to each of the first hinge and the second hinge as rotation centers, and the display unit and the substrate are electrically connected via the electrical connection portion.

2. The head-mounted display according to claim 1, wherein the head-mounted display is configured to accommodate the second housing portion on an inner side of the first housing portion, and the accommodation of the second housing portion is based on the rotation of the first housing portion and the second housing portion about rotation centers.

3. The head-mounted display according to claim 2, wherein the accommodation of the second housing portion is at a position that maintains an unobstructed view of the display unit.

4. The head-mounted display according to claim 1, wherein the band further includes:

a first connection member connected to the first housing portion; and a second connection member connected to the second housing portion, and the first connection member and the second connection member are rotatable with respect to each of the first hinge and the second hinge as the rotation centers.

5. The head-mounted display according to claim 4, wherein the first connection member includes a first end portion and a second end portion, the second end portion is on an opposite side of the first end portion, the second connection member includes a third end portion and a fourth end portion, the fourth end portion is on an opposite side of the third end portion, the first hinge which is configured to rotatably connect the first end portion and the third end portion, and the second hinge is configured to rotatably connect the second end portion and the fourth end portion.

6. The head-mounted display according to claim 5, wherein the first connection member includes a first adjustment mechanism configured to adjust a length from the first end portion to the second end portion.

7. The head-mounted display according to claim 6, wherein the first connection member includes a first division member including the first end portion and a second division member including the second end portion, the first adjustment mechanism includes a coupling member configured to connect the first division member and the second division member, and the first division member is movable relative to the second division member based on the connection of the first division member and the second division member.

8. The head-mounted display according to claim 7, wherein a movement of the first division member is synchronized with a movement of the second division member based on the connection of the first division member and the second division member.

9. The head-mounted display according to claim 8, wherein the first connection member includes a reference point that serves as a reference for measurement of a first distance and a second distance, the first distance is from the reference point to the first end portion of the first division member, the second distance is from the reference point to the second end portion of the second division member, and the first distance and the second distance are synchronized based on the connection of the first division member and the second division member.

10. The head-mounted display according to claim 4, wherein the first connection member includes a restriction portion-which restricts configured to restrict detachment of the first connection member from the first housing portion.

11. The head-mounted display according to claim 10, wherein the first connection member includes a first end portion and a reference point, the reference point is a reference for a distance of the first end portion, the restriction portion is configured to restrict a change of the distance of the first end portion, and the distance remains less than a specific length based on the restriction of the change in the distance of the first end portion.

12. The head-mounted display according to claim 5, wherein the second connection member includes a second adjustment mechanism configured to adjust a length from the third end portion to the fourth end portion.

13. The head-mounted display according to claim 12, wherein the electrical connection portion includes a flexible substrate configured to electrically connect the display unit and the substrate, the flexible substrate is deformable based on the adjustment of the length from the third end portion to the fourth end portion, and the second housing portion includes an accommodation member configured to accommodate the flexible substrate.

14. The head-mounted display according to claim 12, wherein the electrical connection portion includes a cable configured to electrically connect the display unit to the substrate, and the second housing portion includes a winding member configured to wind the cable based on the adjustment of the length from the third end portion to the fourth end portion.

15. The head-mounted display according to claim 12, wherein the electrical connection portion includes a cable configured to electrically connect the display unit to the substrate, the second connection member includes a groove portion into which the cable is press-fit, and the second housing portion includes a press fit member configured to press-fit the cable into the groove portion based on the adjustment of the length from the third end portion to the fourth end portion.

16. The head-mounted display according to claim 1, wherein each of the first hinge and the second hinge includes a fixing mechanism configured to fix a relative rotation angle of the first housing portion and the second housing portion about the first hinge and the second hinge at a specific angle.

17. The head-mounted display according to claim 1, further comprising a battery is arranged in the second housing portion.

18. The head-mounted display according to claim 2, wherein the first housing portion includes a first protrusion portion, the second housing portion includes a second protrusion portion, and the first protrusion portion is in contact with the second protrusion portion in a state where the second housing portion is accommodated in the first housing portion.

19. The head-mounted display according to claim 18, wherein at least one of the first protrusion portion or the second protrusion portion includes a spring mechanism, the spring mechanism is configured to apply a pressing force, and the second housing portion is fixed by the application of the pressing force in the state where the second housing portion is accommodated in the first housing portion.

20. The head-mounted display according to claim 1, wherein each of the first hinge and the second hinge includes a limitation mechanism configured to limit the rotation of the first housing portion and the second housing portion, and a relative rotation angle between the first housing portion and the second housing portion is less than a specific angle based on the limitation of the rotation.

* * * * *